(12) United States Patent
Hicklin et al.

(10) Patent No.: US 9,208,208 B2
(45) Date of Patent: Dec. 8, 2015

(54) TABLE APPLICATION PROGRAMMING INTERFACES (APIS)

(71) Applicant: The MathWorks, Inc., Natick, MA (US)

(72) Inventors: Joseph F. Hicklin, Upton, MA (US); Peter C. Perkins, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/554,605

(22) Filed: Nov. 26, 2014

(65) Prior Publication Data

US 2015/0081748 A1 Mar. 19, 2015

Related U.S. Application Data

(63) Continuation of application No. 14/196,480, filed on Mar. 4, 2014.

(60) Provisional application No. 61/788,787, filed on Mar. 15, 2013.

(51) Int. Cl.
*G06F 17/30* (2006.01)
*G06F 17/24* (2006.01)

(52) U.S. Cl.
CPC .......... *G06F 17/3056* (2013.01); *G06F 17/245* (2013.01); *G06F 17/246* (2013.01); *G06F 17/30292* (2013.01)

(58) Field of Classification Search
CPC .................. G06F 17/30286; Y10S 707/99941

USPC .................................. 707/791, 803; 719/328
See application file for complete search history.

(56) References Cited

U.S. PATENT DOCUMENTS

| | | | |
|---|---|---|---|
| 6,615,172 B1 * | 9/2003 | Bennett et al. ................ | 704/257 |
| 7,933,908 B1 | 4/2011 | Perkins et al. | |
| 7,991,800 B2 * | 8/2011 | Lawrence et al. ............. | 707/803 |
| 8,619,090 B2 * | 12/2013 | Spada et al. .................. | 345/581 |
| 2006/0048045 A1 | 3/2006 | Lehenbauer et al. | |
| 2014/0280374 A1 | 9/2014 | Hicklin et al. | |

OTHER PUBLICATIONS

The MathWorks, Inc., "Arrays for statistical data—MATLAB", 3 pages, Mar. 8, 2013 (print date).
Matlab Central, "Pivot Table in Matlab," http://nl.mathworks.com/matlabcentral/newsreader/view_thread/155058, Aug. 23, 2007, 7 pages.

(Continued)

*Primary Examiner* — Cheryl Lewis
(74) *Attorney, Agent, or Firm* — Harrity & Harrity, LLP

(57) ABSTRACT

A device receives, in a technical computing environment (TCE), a first variable with a first data type and a particular number of rows, and receives a second variable with a second data type and the particular number of rows. The second data type may be different than the first data type. The device receives a command to create a table based on the first variable and the second variable, and creates, based on the command, a heterogeneous table that includes the first variable and the second variable. The device stores the heterogeneous table, and/or provides the heterogeneous table for display.

35 Claims, 15 Drawing Sheets

(56) References Cited

OTHER PUBLICATIONS

Comsol, "How to get Data of Table by Matlab," http://www.comsol.nl/community/forums/general/thread/12287, Jun. 20, 2012, 2 pages.

Notification of Transmittal of the International Search Report and The Written Opinion of the International Searching Authority, or the Declaration corresponding to PCT/US2014/026073, mailed on Feb. 20, 2015, 11 pages.

* cited by examiner

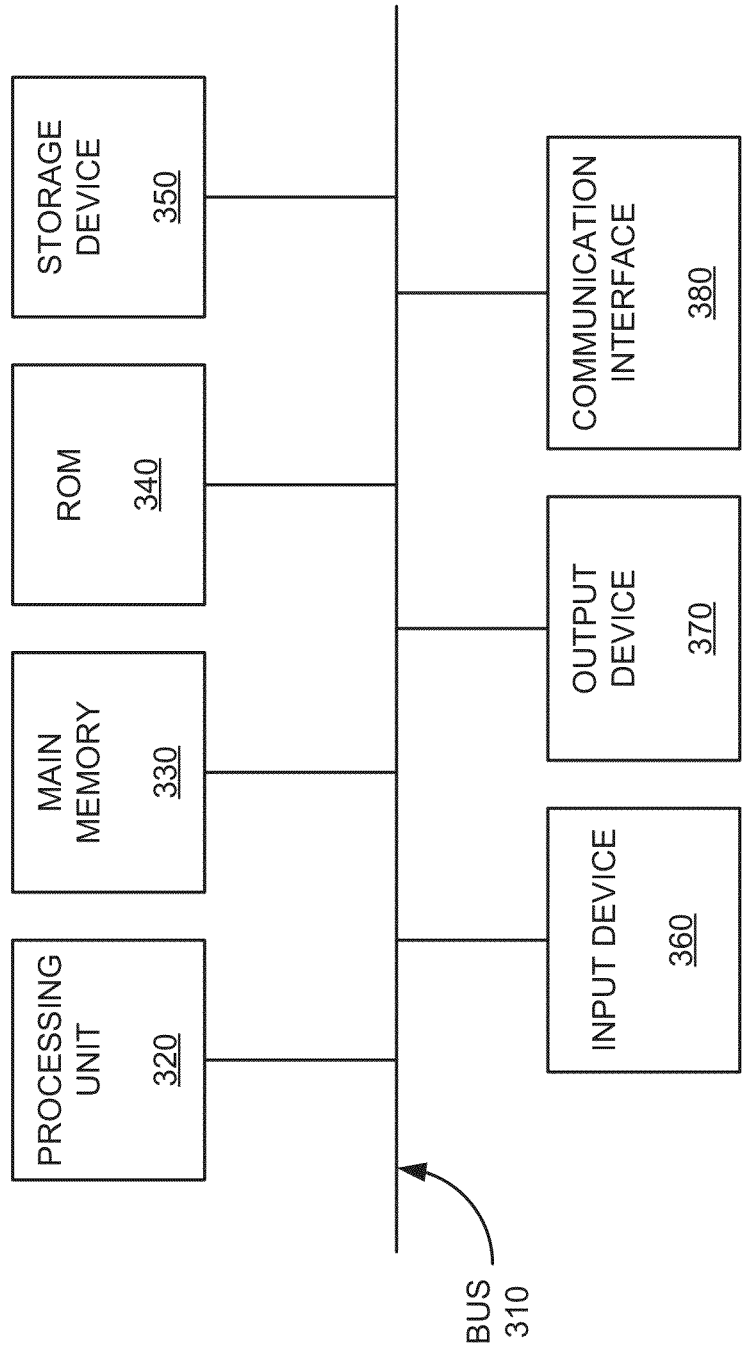

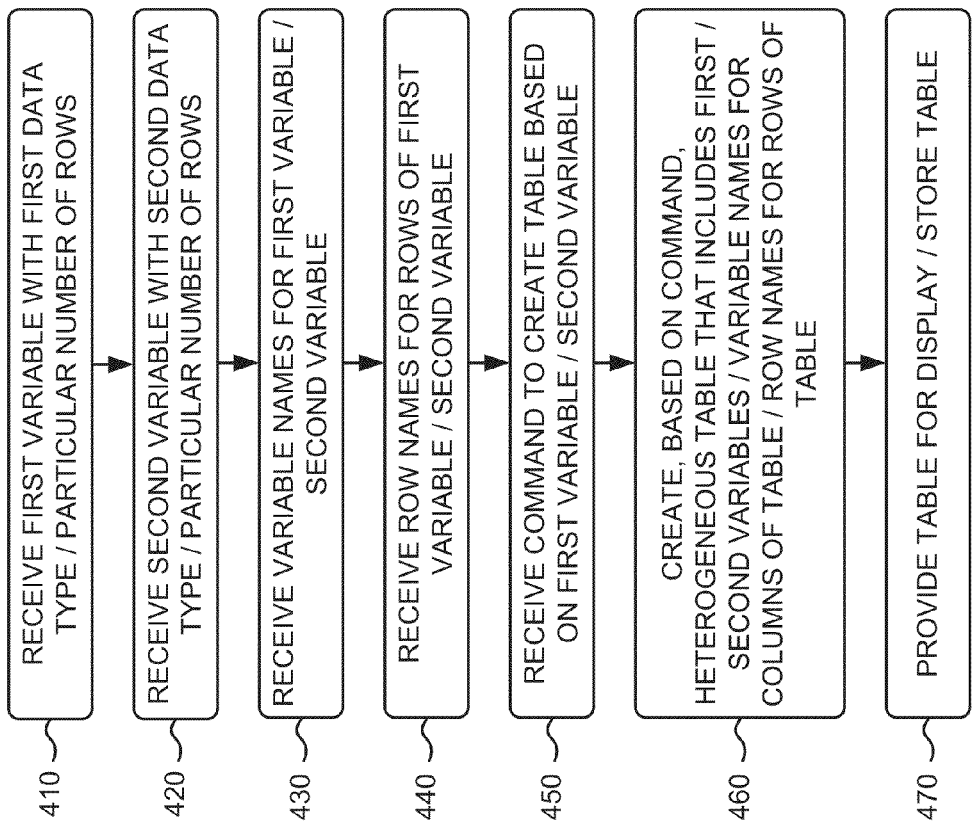

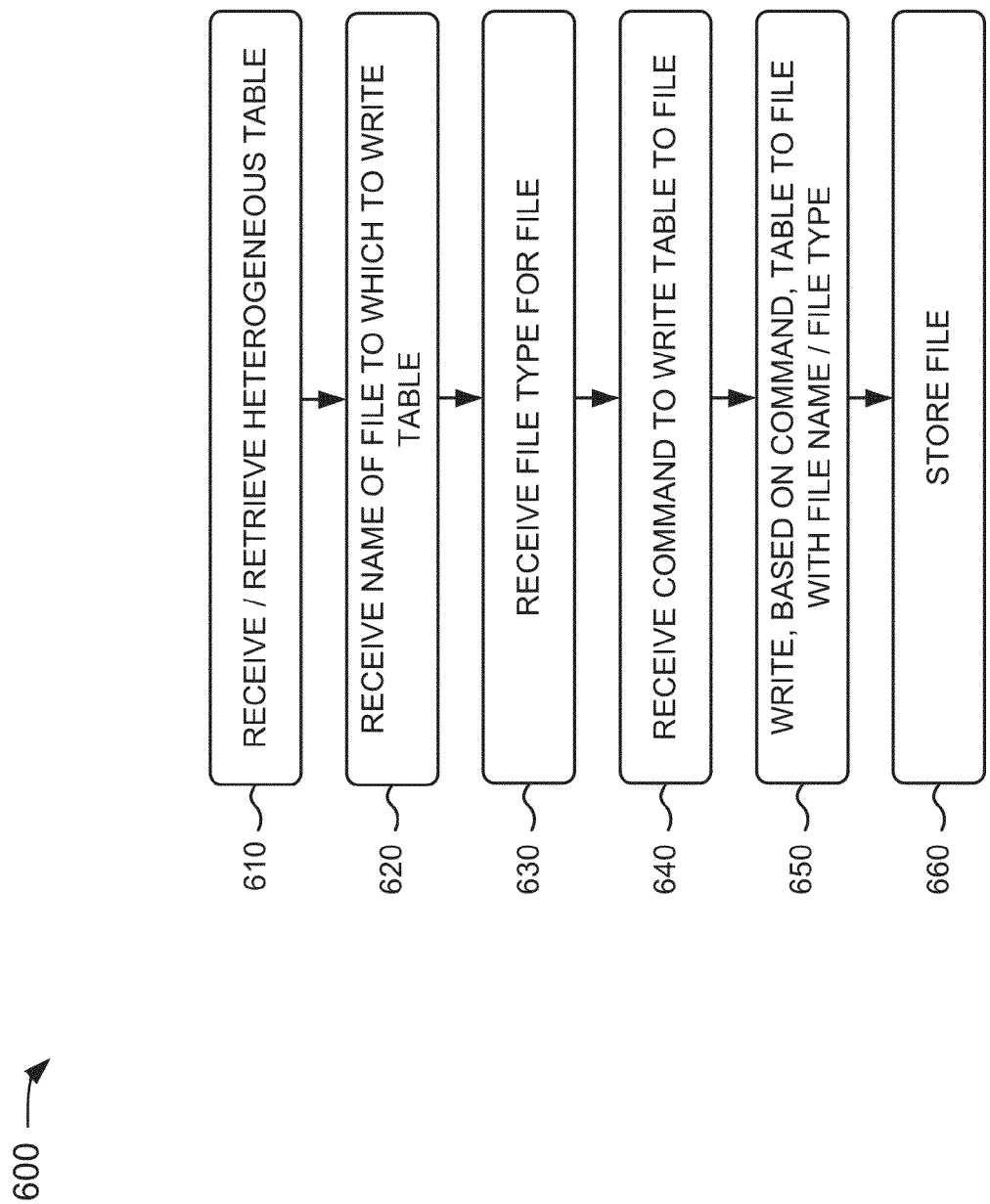

FIG. 7C

```
>> LIA = ismember(A, B)
>> [LIA, LOCB] = ismember(A, B)

>> C = unique(A)
>> [C, IA, IC] = unique(A)
>> [C, IA, IC] = unique(A, OCCURRENCE)
>> [C, IA, IC] = unique(A, 'stable')

>> C = union(A, B)
>> [C, IA, IB] = union(A, B)
>> [C, ...] = union(A, B, 'stable')
>> [C, ...] = union(A, B, 'sorted')

>> C = intersect(A, B)
>> [C, IA, IB] = intersect(A, B)
>> [C, ...] = intersect(A, B, 'stable')
>> [C, ...] = intersect(A, B, 'sorted')
```

```
>> TALL = stack(WIDE, DATAVARS)
>> [TALL, IWIDE] = stack(WIDE, DATAVARS)

>> WIDE = unstack(TALL, DATAVAR, INDVAR)
>> [WIDE, ITALL] = unstack(TALL, DATAVAR, INDVAR)

>> B = rowfun(FUN, A)
>> B = rowfun(FUN, A, 'PARAM1', val1, 'PARAM2', val2, ...)

>> B = varfun(FUN, A)
>> B = varfun(FUN, A, 'PARAM1', val1, 'PARAM2', val2, ...)
```

TABLE APPLICATION PROGRAMMING INTERFACES (APIS)

RELATED APPLICATION

This application is a continuation application of U.S. patent application Ser. No. 14/196,480, filed Mar. 4, 2014, which claims priority under 35 U.S.C. §119 based on U.S. Provisional Patent Application No. 61/788,787, filed Mar. 15, 2013, the disclosures of which are incorporated by reference herein in their entireties.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 3 is a diagram of example components of one or more of the devices of the environment depicted in FIG. 2;

FIG. 4 is a flow chart of an example process for creating a table based on variables;

FIG. 6 is a flow chart of an example process for writing a table to a file; and

FIGS. 7A-7F are diagrams of an example of the process described above with respect to FIG. 6.

DETAILED DESCRIPTION

The following detailed description refers to the accompanying drawings. The same reference numbers in different drawings may identify the same or similar elements.

A heterogeneous array is one type of data container. At least one element of a heterogeneous array may include a different data type than at least one other element of the heterogeneous array. In one particular heterogeneous array, elements of each column must have the same data type but different columns may have different data types.

Overview

Systems and/or methods described herein may provide a table application programming interface (API) that creates a table. The table may provide heterogeneous data and/or metadata, such as, for example, variable and row names, in a single data container. The table may store column-oriented or tabular data (e.g., stored as columns in a text file, spreadsheet, etc.), and may accommodate variables of different types, sizes, units, etc.

Figure 1:
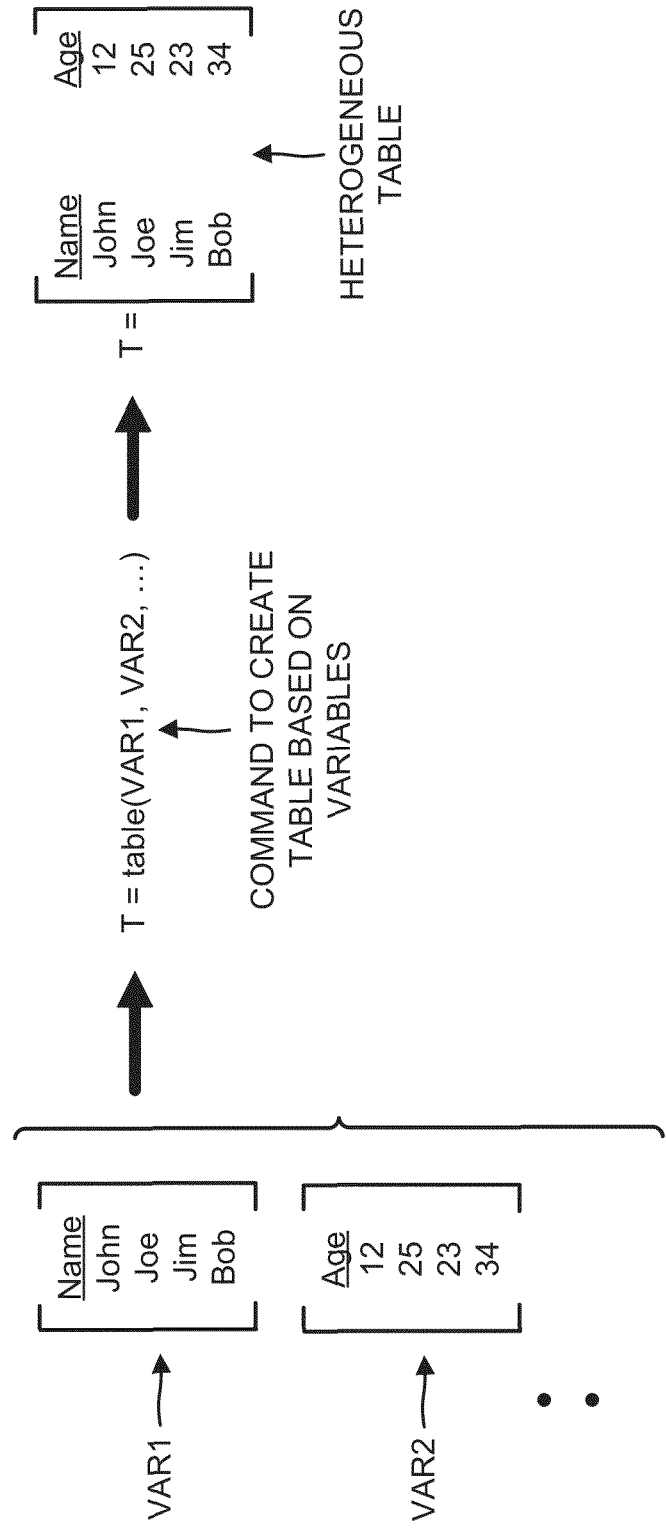
FIG. 1 is a diagram of an overview of an example implementation described herein.

FIG. 1 is a diagram of an overview of an example implementation described herein. For the overview, assume that a device receives a first variable (e.g., VAR1) with a first data type (e.g., a textual data type) and a second variable (e.g., VAR2) with a second data type (e.g., a numeric data type). The first variable may include an array with one column (e.g., Name) and four rows. The column names of the first variable may not be considered a row of the first variable. The second variable may include an array with one column (e.g., Age) and four rows. The column names of the second variable may not be considered a row of the second variable.

As further shown in FIG. 1, the device may receive a command, such as T=table(VAR1, VAR2, . . . ). In some implementations, the command may include additional characters, different characters, or differently arranged characters. The command may be utilized by the device to create a table (T) from the first variable and the second variable. For example, the command shown in FIG. 1 may create a heterogeneous table (T) that includes the column name (e.g., Name) and rows of the first variable and the column name (e.g., Age) and rows of the second variable. The table (T) may be heterogeneous since the columns of the table (T) include two different data types (e.g., a textual data type and a numeric data type).

Such an arrangement may provide simple and convenient APIs for creating and manipulating tables. The APIs may make writing code more intuitive and less time consuming for a user (e.g., a programmer, a software developer, etc.), which may enable the user to accomplish tasks more quickly and efficiently. The APIs may make heterogeneous tables useful to more people. The table APIs may allow data to be easily imported into tables or exported as tables. The table APIs may allow operations to be performed on tables, such as identifying a row that appears in one table but not in another, adding tables together, etc. The table APIs may allow for tables having heterogeneous data types, such as integers, text, cell arrays, etc. The table APIs may display data in a table format and may include column and row names or identifiers if desired. The table APIs make it very easy for users to interact with data that is best arranged in a tabular format without having to manually construct or figure out how to perform operations on tables.

The terms code and program code, as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a device (e.g., via a touch screen display, a mouse, a keyboard, a keypad, voice commands, etc.).

Example Environment Arrangement

Figure 2:
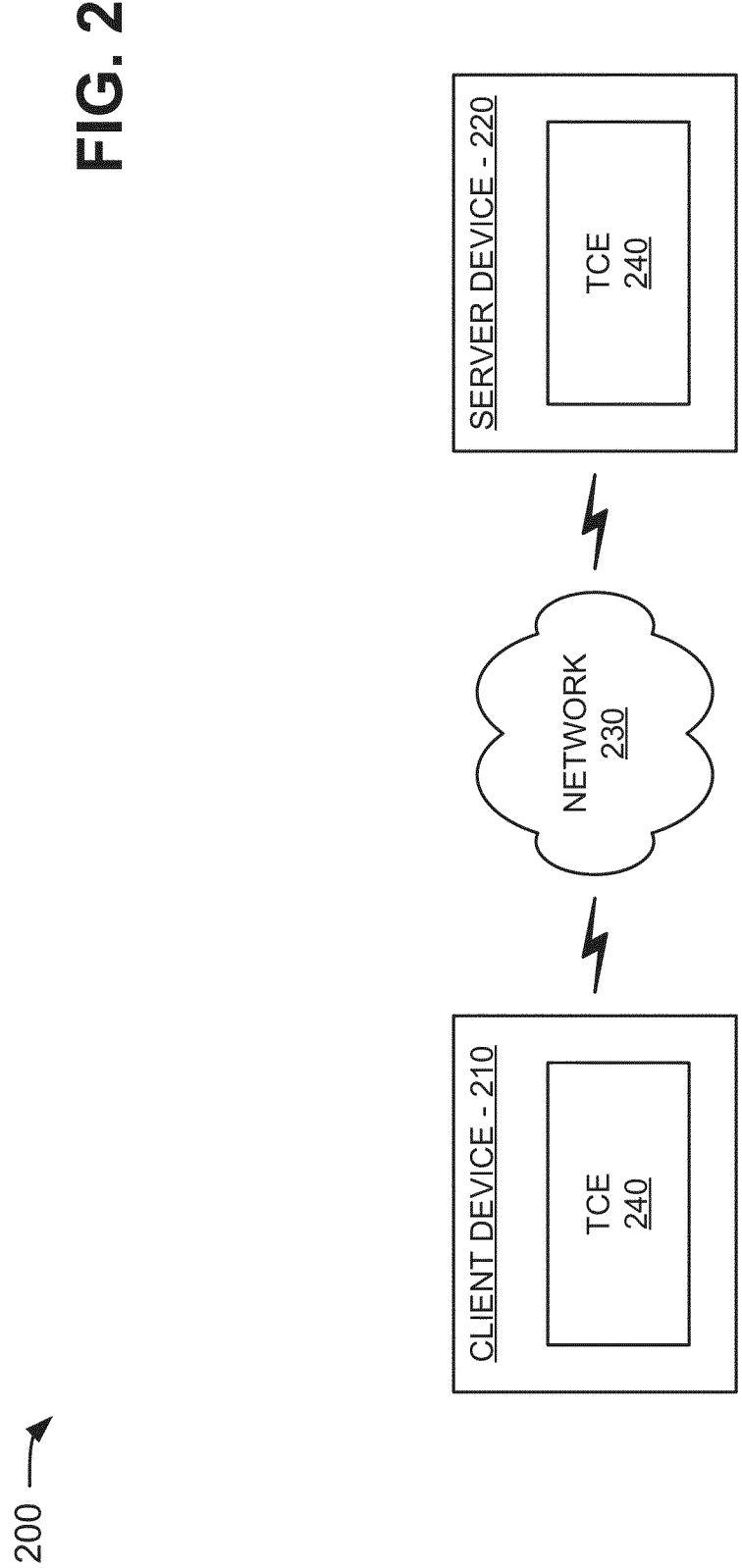
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices. In some implementations, client device 210 may include a TCE 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a METLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Creating A Table Based on Variables

FIG. 4 is a flow chart of an example process 400 for creating a table based on variables. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include receiving a first variable with a first data type and a particular number of rows (block 410). For example, client device 210/TCE 240 may receive a first variable that includes one or more columns and a particular number of rows. The first variable may include a first data type, such as, for example a numeric data type, textual data type, etc. In some implementations, client device 210/TCE 240 may receive the first variable from server device 220, may retrieve the first variable from memory (e.g., main memory 330, FIG. 3), may receive the first variable from a user of client device 210/TCE 240 (e.g., via user inputs), etc. The user may instruct client device 210 to load the first variable into TCE 240 using a command (e.g., a 'load' command), and client device 210 may load the first variable into TCE 240 based on the command.

As further shown in FIG. 4, process 400 may include receiving a second variable with a second data type and the particular number of rows (block 420). For example, client device 210/TCE 240 may receive a second variable that includes one or more columns and the particular number of rows. The second variable may include a second data type, such as, for example a numeric data type, textual data type, etc., and the second data type may be different than the first data type. The first variable and the second variable may include the same number of rows. In some implementations, client device 210/TCE 240 may receive the second variable from server device 220, may retrieve the second variable from memory (e.g., main memory 330, FIG. 3), may receive the second variable from a user of client device 210/TCE 240 (e.g., via user inputs), etc. The user may instruct client device 210 to load the second variable into TCE 240 using a command (e.g., a 'load' command), and client device 210 may load the second variable into TCE 240 based on the command.

Returning to FIG. 4, process 400 may include receiving variable names for the first variable and the second variable (block 430). For example, client device 210/TCE 240 may receive a first variable name for the first variable and a second variable name for the second variable. The first and second variable names may include identifiers and may be unique. In some implementations, client device 210/TCE 240 may receive the first and second variable names from a user of client device 210/TCE 240 (e.g., via user inputs).

As further shown in FIG. 4, process 400 may include receiving row names for rows of the first variable and the second variable (block 440). For example, client device 210/TCE 240 may receive a first row name for rows of the first variable and a second row name for rows of the second variable. The first and second row names may be unique. In some implementations, client device 210/TCE 240 may receive the first and second row names from a user of client device 210/TCE 240 (e.g., via user inputs).

Returning to FIG. 4, process 400 may include receiving a command to create a table based on the first variable and the second variable (block 450). For example, client device 210/TCE 240 may receive a table command. In some implementations, client device 210/TCE 240 may receive the table command from a user of client device 210/TCE 240 (e.g., via user inputs), etc. The table command may include syntax of a general form:
table(VAR1, VAR2, 'VariableNames', {'vname1', 'vname2'}, 'RowNames', {'rname1', 'rname2'}),
where table may correspond to the table command, VAR1 may correspond to the first variable, VAR2 may correspond to the second variable, VariableNames may correspond to a parameter specifying one or more variable names, vname1 may correspond to the first variable name, vname2 may correspond to the second variable name, RowNames may correspond to a parameter specifying one or more row names, rname1 may correspond to the first row name, and rname2 may correspond to the second row name.

In some implementations, the table command may include additional characters, different characters, or differently arranged characters. In some implementations, the user of client device 210/TCE 240 may specify a different syntax for the table command. For example, the user may specify the table command by the general form, table(VAR1, VAR2, . . . ), which creates a table from variables (e.g., VAR1, VAR2, . . . ). In some implementations, the user may specify the table command by the general form, table(. . . , 'VariableNames', {'name1', . . . , 'nameM'}, which creates a table containing variables that include the specified variable names (e.g., name1, . . . , nameM). In some implementations, the user may specify the table command by the general form, table(. . . , 'RowNames', {'name1', . . . , 'nameN'}, which creates a table containing variables that include the specified row names (e.g., name1, . . . , nameN).

In some implementations, a table may include variables that are built-in types or objects that are arrays. The variables may support parenthesis indexing of the form var(i, . . . ), where i may correspond to a numeric or logical vector that corresponds to rows of the variable. The table may implement a size method with a dim argument, and a vertcat method.

In some implementations, the table command may be utilized by client device 210/TCE 240 to create a heterogeneous table. For example, the table command may be used by client device 210/TCE 240 to create, from variables (e.g., with one or more different data types), a heterogeneous table that includes specified variable names and/or specified row names.

In some implementations, the table command may not include domain-specific syntax. For example, the command "table" may be utilized and/or associated with a variety of domains (e.g., statistics, experimental data, financial information, etc.), rather than a specific domain (e.g., statistics).

As further shown in FIG. 4, process 400 may include creating, based on the command, a heterogeneous table that includes the first and second variables, the variable names for columns of the table, and the row names for rows of the table (block 460). For example, client device 210/TCE 240 may create, based on the table command, a heterogeneous table that includes the first variable (VAR1) and the second variable (VAR2). The heterogeneous table may be heterogeneous since the first variable and the second variable have different data types. The heterogeneous table may include the first variable name for a column of the table corresponding to the first variable. The heterogeneous table may include the second variable name for a column of the table corresponding to the second variable. The heterogeneous table may include the row names for rows of the table.

In some implementations, the table command may create a table from variables in a workspace provided by TCE 240. The table command may also create a table by reading data from a text or spreadsheet file. A table may be subscripted using parentheses, and may utilize numeric indices, logical indices, variable name indices, row name indices, etc. Individual variables in a table may be accessed using dot ("•") subscripting, and content of one or more variables of a table may be accessed using brace ("{ }") subscripting. A table may include different kinds of variables, such as numeric, logical, character, categorical, cell, etc. variables. However, a table may be a different class than the variables provided in the table. For example, a table that contains only variables that are double arrays may not be operated on as if the table was a double array.

In some implementations a table (T) may include properties that store metadata. A property (P) may be accessed or assigned to the table using the commands P=T.Properties, PropName and T.Properties.PropName=P, respectively, where PropName may correspond to a table property. For example, the table property may include a string (e.g., Description) describing the table; a two-element cell array of strings (e.g., DimensionNames) containing names of the dimensions of the table; a cell array (e.g., VariableNames) containing names of the variables in the table; a cell array of strings (e.g., VariableDescriptions) containing descriptions of the variables in the table; a cell array of strings (e.g., VariableUnits) containing units for the variables in table; a cell array (e.g., RowNames) of nonempty, distinct strings containing names of the rows in the table; a variable (e.g., UserData) containing any additional information associated with the table; etc. In some implementations, the table properties may be more understandable and intuitive than properties associated with heterogeneous arrays.

Returning to FIG. 4, process 400 may include providing the heterogeneous table for display and/or storing the heterogeneous table (block 470). For example, client device 210/TCE 240 may provide the heterogeneous table for display to a user of client device 210/TCE 240. In some implementations, client device 210/TCE 240 may store the heterogeneous table in memory (e.g., main memory 330, FIG. 3).

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example Creation of A Table Based on Variables

Figure 5A:
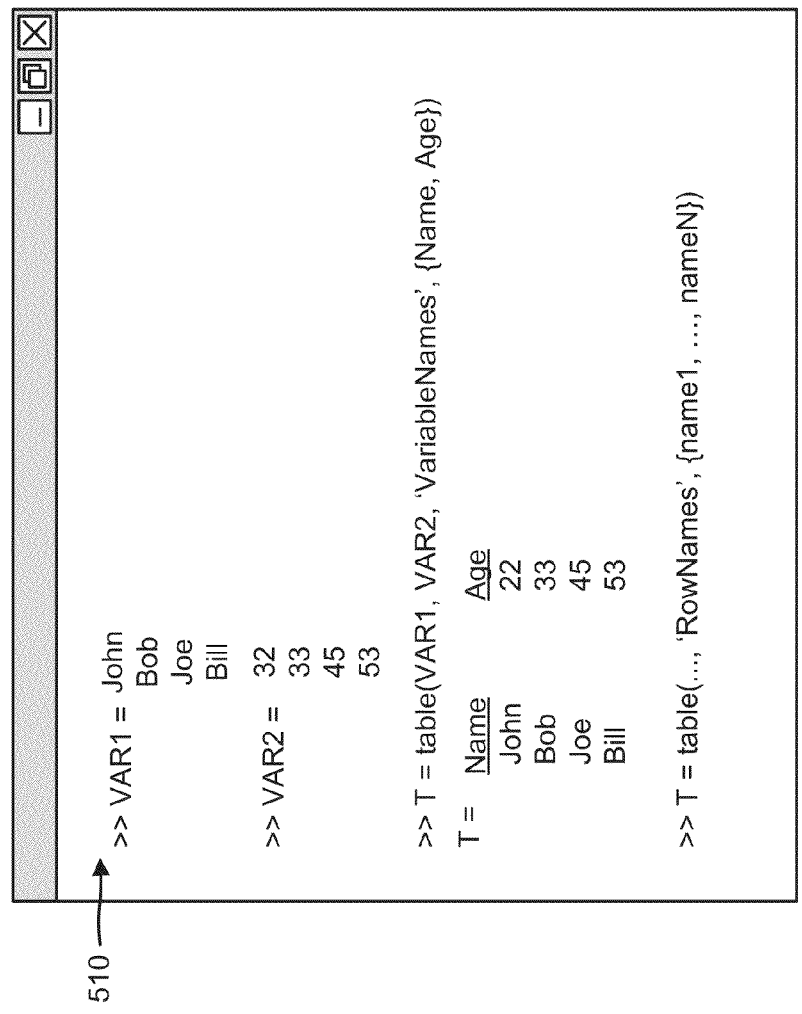
FIGS. 5A-5D are diagrams of an example of the process described above with respect to FIG. 4.

FIGS. 5A-5D are diagrams of an example 500 of the process described above with respect to FIG. 4. In example 500, assume that client device 210/TCE 240 provides a user interface 510 for display to a user, as shown in FIG. 5A. User interface 510 may include, for example, a workspace of TCE 240. Client device 210/TCE 240 may receive a first variable (VAR1) that includes one or more columns and a particular number of rows. As further shown in FIG. 5A, the first variable may include an array of names (e.g., John, Bob, Joe, and Bill) and a first data type, such as, for example, a textual data type. As further shown in FIG. 5A, client device 210/TCE 240 may receive a second variable that includes one or more columns and the particular number of rows. The first variable may include an array of ages (e.g., 32, 33, 45, and 53) and a second data type, such as, for example, a numeric data type.

Client device 210/TCE 240 may receive a table command from a user of client device 210/TCE 240 (e.g., via user inputs), etc. The table command may include syntax of a form: T=table(VAR1, VAR2, 'VariableNames', {Name, Age}), where T may correspond to a heterogeneous table, table may correspond to the table command, VAR1 may correspond to the first variable, VAR2 may correspond to the second variable, VariableNames may correspond to a parameter specifying the variable names, Name may correspond to the first variable name, and Age may correspond to the second variable name.

Client device 210/TCE 240 may create, based on the table command, a heterogeneous table (T) that includes the first variable (VAR1) and the second variable (VAR2). The heterogeneous table may be heterogeneous since the first variable and the second variable have different data types. The heterogeneous table may include the first variable name for a column of the table corresponding to the first variable. The heterogeneous table may include the second variable name for a column of the table corresponding to the second variable. Client device 210/TCE 240 may store and/or display the heterogeneous table. For example, as shown in FIG. 5A, user interface 510 may display the heterogeneous table (T) as follows:

| Name | Age |
|------|-----|
| John | 22 |
| Bob | 33 |
| Joe | 45 |
| Bill | 53 |

In example 500, further assume that the user may utilize client device 210/TCE 240 to provide another table command: T=table(..., 'RowNames', {name1, ..., nameN}), where T may correspond to a heterogeneous table, table may correspond to the table command, RowNames may correspond to a parameter specifying row names, name1 may correspond to a first row name, and nameN may correspond to an Nth row name. The other table command may cause client device 210/TCE 240 to create a table that includes specified row names that are unique.

Figure 5B:
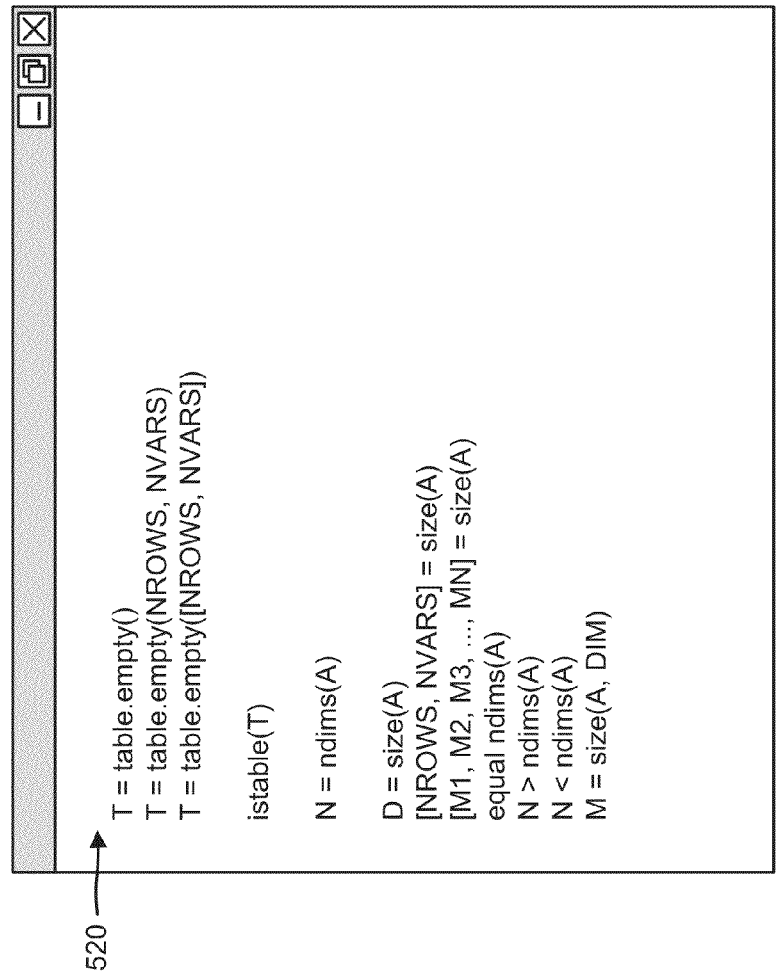

In example 500, assume that client device 210/TCE 240 provides a user interface 520 for display to the user, as shown in FIG. 5B. User interface 520 may include, for example, a workspace of TCE 240. The user may utilize client device 210/TCE 240 to provide commands to create an empty table. For example, the user may provide T=table.empty( ), which may cause client device 210/TCE 240 to create a 0×0 table. The user may also provide T=table.empty(NROWS, NVARS) or T=table.empty([NROWS, NVARS]), which may cause client device 210/TCE 240 to create an NROWS× NVARS table (e.g., when NROWS or NVARS may be zero).

In example 500, further assume that the user utilizes client device 210/TCE 240 to input an istable(T) command. The istable(T) command may cause client device 210/TCE 240 to return a logical true (1) if T is a table and a logical false (0) if T is not a table. As further shown in FIG. 5B, the user may utilize client device 210/TCE 240 to input a command (e.g., N=ndims(A)). The command may cause client device 210/TCE 240 to return a number of dimensions of a table (A).

In example 500, further assume that the user utilizes client device 210/TCE 240 to provide size commands associated with a size of a table. For example, the user may provide D=size(A), which may cause client device 210/TCE 240 to return a two-element row vector D=[NROWS, NVARS] containing a number of rows and variables in a table (A). The user may provide [NROWS, NVARS]=size(A), which may cause client device 210/TCE 240 to return a number of rows and variables in a table (A) as separate output variables. The user may provide [M1, M2, M3, ..., MN]=size(A), for N>1, which may cause client device 210/TCE 240 to return sizes of a first N dimensions of a table (A). If a number of output arguments (N) does not equal ndims(A), then for N>ndims (A), the size command may cause client device 210/TCE 240 to return ones in extra variables (e.g., outputs ndims(A)+1 through N); and for N<ndims(A), MN may contain a product of the sizes of dimensions N through ndims(A). The user may provide M=size(A, DIM), which may cause client device 210/TCE 240 to return a length of a dimension specified by a scalar DIM. For example, size(A, 1) which may cause client device 210/TCE 240 to return a number of rows. If DIM>ndims(A), then M may be one.

Figure 5C:
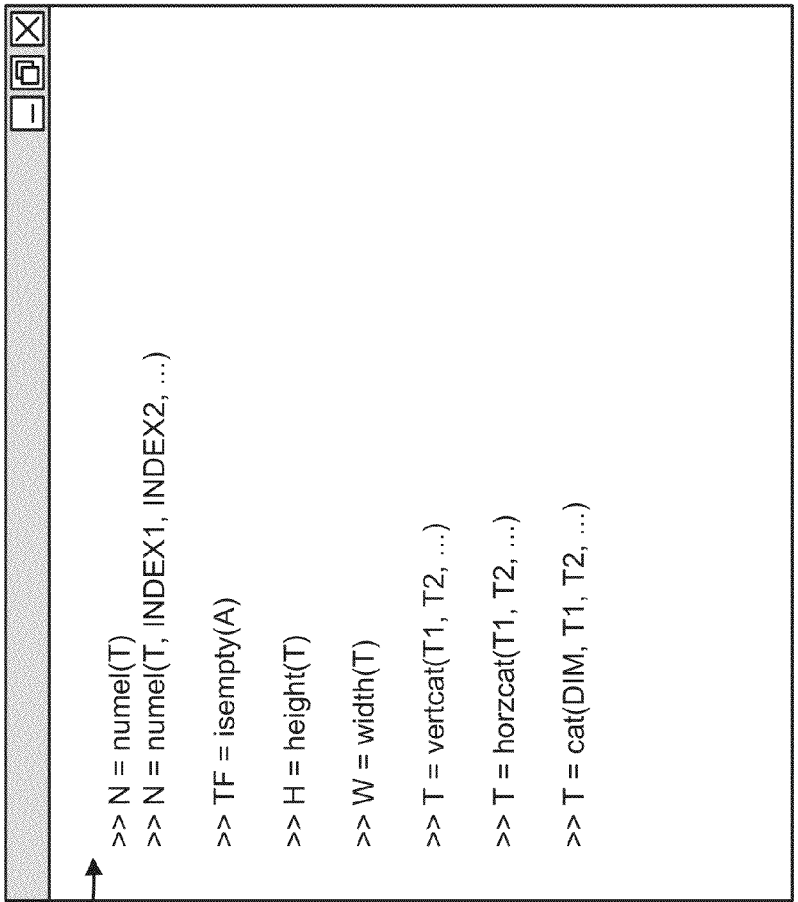

In example 500, assume that client device 210/TCE 240 provides a user interface 530 for display to the user, as shown in FIG. 5C. User interface 530 may include, for example, a workspace of TCE 240. The user may utilize client device 210/TCE 240 to provide commands to determine a number of elements in a table. For example, the user may provide N=numel(T), which may cause client device 210/TCE 240 to return a number of elements in a table (T). The user may also provide N=numel(T, INDEX1, INDEX2, ... ), which may cause client device 210/TCE 240 to returns a number of subscripted elements in T(INDEX1, INDEX2, ... ).

In example 500, further assume that the user utilizes client device 210/TCE 240 to input a command (e.g., TF=isempty (A)). The command may cause client device 210/TCE 240 to return a logical true (1) if A is an empty table and a logical false (0) if A is not an empty table. An empty table may not have any elements. As further shown in FIG. 5C, the user may utilize client device 210/TCE 240 to input a command (e.g., H=height(T)). The command may cause client device 210/ TCE 240 to return a number of rows in a table (T). The user may utilize client device 210/TCE 240 to input a command (e.g., W=width(T)). The command may cause client device 210/TCE 240 to return a number of variables in a table (T).

As further shown in FIG. 5C, the user may utilize client device 210/TCE 240 to input a command (e.g., T=vertcat(T1, T2, ... )). The command may cause client device 210/TCE 240 to vertically concatenate tables (T1, T2, ... ). Row names, if present, may be unique across tables, and the vertcat command may fill in default row names for an output when some inputs have names and some inputs do not have names. Variable names for all tables may be identical except for order. The vertcat command may concatenate by matching variable names, and may assign values for each property (e.g., except for RowNames) in a table (T) using a first non-empty value for a corresponding property in the tables (T1, T2, . . . ).

As further shown in FIG. 5C, the user may utilize client device 210/TCE 240 to input a command (e.g., T=horzcat(T1, T2, . . . )). The command may cause client device 210/TCE 240 to horizontally concatenate tables (T1, T2, . . . ). All inputs may have unique variable names, and row names for all tables that have row names may be identical except for order. The horzcat command may concatenate by matching row names for tables that have row names, or by positioning for tables that do not have row names. The horzcat command may assign values for the Description and UserData properties in a table (T) using a first non-empty value for a corresponding property in the tables (T1, T2, . . . ). The user may utilize client device 210/TCE 240 to input a command (e.g., T=cat(DIM, T1, T2, . . . )). The command may cause client device 210/TCE 240 to concatenate tables (T1, T2, . . . ) along a dimension (DIM) by calling a horzcat method or a vertcat method.

Figure 5D:
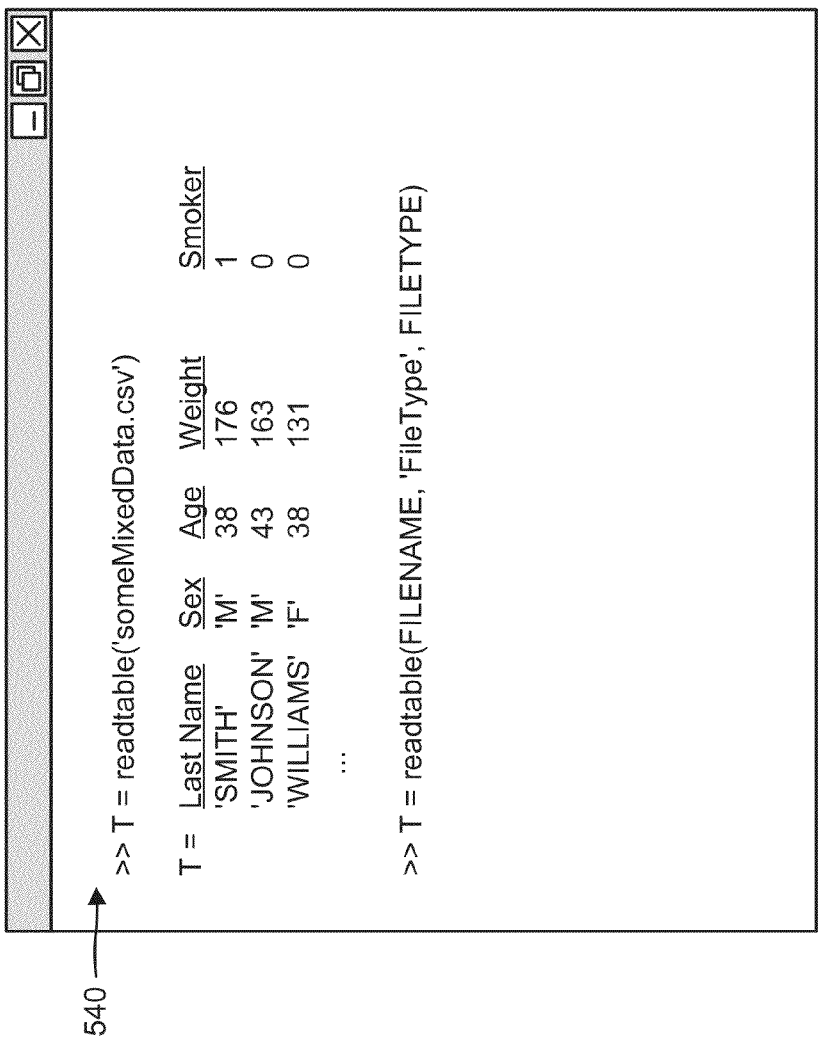

In example 500, further assume that client device 210/TCE 240 provides a user interface 540 for display to the user, as shown in FIG. 5D. User interface 540 may include, for example, a workspace of TCE 240. The user may utilize client device 210/TCE 240 to provide commands to create a table by reading information from a file. For example, the user may provide a readtable command, which may cause client device 210/TCE 240 to create a table by reading column-oriented data from a file. The readtable command may automatically determine the file format from the file extension as described below. As shown in FIG. 5D, the user may provide a command (e.g., T=readtable(someMixedData.csv)), which may cause client device 210/TCE 240 to create a table by reading from a file with a file name of "someMixedData," and to determine the file format from the file extension (e.g., ".csv"). User interface 540 may display a table (T), which may correspond to the information read from the file.

The user may provide, to client device 210/TCE 240, another command (e.g., T=readtable(FILENAME, 'FileType', FILETYPE)) that specifies a file type (e.g., text, spreadsheet, or xport). The readtable command may cause client device 210/TCE 240 to read data from different file types, such as delimited text files (e.g., .txt, .dat, .csv, etc.) that are comma-delimited by default. Reading from a delimited text file may create one variable in a table (T) for each column in the file. Variable names may be taken from the first row of the file. By default, the variables created may be either double, if the entire column is numeric, or a cell array of strings, if any element in a column is not numeric. The readtable command may convert empty fields in the file to either NaN (for a numeric variable) or an empty string (for a string-valued variable). Insignificant whitespace in the file may be ignored.

Optional parameter name/value pairs may be used to control how data is read from a delimited text file. For example, a Delimiter parameter may determine a delimiter used in the file. The delimiter may include ",'\t', ',', ';', '|' or corresponding string names (e.g., 'space', 'tab', 'comma', 'semi', or 'bar'). A ReadVariableNames parameter may include a logical value that specifies whether or not the first row of the file is treated as variable names. A ReadRowNames parameter may include a logical value that specifies whether or not the first column of the file is treated as row names. If the ReadVarNames and ReadRowNames parameter values are both true, the name in the first column of the first row of the file may be saved as a first dimension name for the table. A TreatAsEmpty parameter may cause one or more strings to be treated as an empty string in a numeric column. The one or more strings may be a character string or a cell array of strings. Table elements corresponding to the one or more strings may be set to NaN. A HeaderLines parameter may define a number of lines to skip at the beginning of the file. A Format parameter may include a format string to define columns in the file, as accepted by a textscan function. If the user specifies the Format parameter, the user may also specify any of the parameter name/value pairs accepted by the textscan function. Specifying the Format parameter may significantly improve speed for larger files.

The readtable command may cause client device 210/TCE 240 to read data from a spreadsheet file (e.g., a .xls, or .xlsx file). Reading from a spreadsheet file may create one variable in a table (T) for each column in the file. By default, the variables created may be either double, or a cell array of strings. Variable names may be taken from the first row of the spreadsheet file.

Optional parameter name/value pairs may be used to control how data is read from a spreadsheet file. For example, a ReadVariableNames parameter may include a logical value that specifies whether or not the first row of the file is treated as variable names. A ReadRowNames parameter may include a logical value that specifies whether or not the first column of the file is treated as row names. If the ReadVarNames and ReadRowNames parameter values are both true, the name in the first column of the first row of the file may be saved as a first dimension name for the table. A TreatAsEmpty parameter may cause one or more strings to be treated as an empty cell in a numeric column. The one or more strings may be a character string or a cell array of strings. Table elements corresponding to the one or more strings may be set to NaN. A Sheet parameter may identify a sheet to read and may be specified as a string that contains the spreadsheet name or a positive integer indicating a spreadsheet index. A Range parameter may include a string that specifies a rectangular portion of the spreadsheet to read. If the user does not specify a Sheet parameter, the Range parameter may include both corners and a colon character (:). If the spreadsheet contains figures or other non-tabular information, the user may utilize the Range parameter to read only the tabular data. By default, an XLSFile option may read data from the spreadsheet contiguously out to the right-most column that contains data, including any empty columns that precede it. If the spreadsheet contains one or more empty columns between columns of data, the Range parameter may be used to specify a rectangular range of cells from which to read variable names and data.

The readable command may cause client device 210/TCE 240 to read data from a SAS XPORT file (e.g., a .xpt file). Reading from an XPORT format file may create one variable in a table (T) for each variable in the file. Variable names from the file may be preserved. Numeric data types in the file may be preserved but all other data types may be converted to a cell arrays of strings. The XPORT format may permit a number of missing data types, which may be represented in the file by an upper case letter, '•' or '_'. All missing data may be converted to NaN values in the table (T).

Optional parameter name/value pairs may be used to control how data is read from an XPORT file. For example, a ReadRowNames parameter may include a logical value specifying whether or to use a first variable in the file as row names. If the content of the first variable are not valid row names, then the variable may be read into a variable of the table and row names may not be set.

In some implementations, the readtable command may provide a simpler constructor for a table that is more in line with naming patterns provided by TCE 240. This may make the readtable command more predictable.

Example Process for Writing A Table to A File

FIG. 6 is a flow chart of an example process 600 for writing a table to a file. In some implementations, process 600 may be performed by client device 210/TCE 240. In some implementations, process 600 may be performed by another device or a group of devices (e.g., server device 220) separate from or including client device 210.

As shown in FIG. 6, process 600 may include receiving or retrieving a heterogeneous table (block 610). For example, client device 210/TCE 240 may receive or retrieve a heterogeneous table that includes one or more columns and rows. In some implementations, client device 210/TCE 240 may receive the heterogeneous table from server device 220, may retrieve the heterogeneous table from memory (e.g., main memory 330, FIG. 3), may receive the heterogeneous table from a user of client device 210/TCE 240 (e.g., via user inputs), etc. The heterogeneous table may include the features of the heterogeneous array described above in connection with FIGS. 1 and 4. The user may instruct client device 210 to load the heterogeneous table into TCE 240 using a command (e.g., a 'load' command), and client device 210 may load the heterogeneous table into TCE 240 based on the command.

As further shown in FIG. 6, process 600 may include receiving a name of file to which to write the heterogeneous table (block 620). For example, client device 210/TCE 240 may receive a file name to which to write the heterogeneous table. In some implementations, client device 210/TCE 240 may receive the file name from the user of client device 210/TCE 240 (e.g., via user inputs), etc. In some implementations, the file name may include an extension (e.g., .txt, .dat, .csv, .xls, .xpt, etc.), and client device 210/TCE 240 may determine a file format from the extension. For example, a delimited text file format may include an extension (e.g., .txt, .dat, or .csv), a spreadsheet file format may include an extension (e.g., .xls or .xlsx), and a SAS XPORT file format may include an extension (e.g., .xpt).

Returning to FIG. 6, process 600 may include receiving a file type for the file (block 630). For example, client device 210/TCE 240 may receive a file type for the file. In some implementations, client device 210/TCE 240 may receive the file type from the user of client device 210/TCE 240 (e.g., via user inputs), etc. In some implementations, the file type may include a delimited text file type, a spreadsheet file type, or a SAS XPORT file type. The delimited text file type may include an extension (e.g., .txt, .dat, or .csv), a spreadsheet file type may include an extension (e.g., .xls or .xlsx), and a SAS XPORT file type may include an extension (e.g., .xpt).

As further shown in FIG. 6, process 600 may include receiving a command to write the table to the file (block 640). For example, client device 210/TCE 240 may receive a write table command. In some implementations, client device 210/TCE 240 may receive the write table command from the user of client device 210/TCE 240 (e.g., via user inputs), etc. The write table command may include syntax of a general form:

writetable(T, FILENAME, 'FileType', FILETYPE), where writeable may correspond to the write table command, T may correspond to the heterogeneous table, FILENAME may correspond to the file name, FileType may correspond to a parameter specifying the file type, and FILETYPE may correspond to the file type.

In some implementations, the write table command may include syntax of a general form write(T). The write(T) command may write a table (T) to a comma-delimited text file with a file name that is a workspace name of the table (T) append with ".txt." If the write(T) command cannot construct the file name from the table input, the command may write to a file "table.txt." In some implementations, the write table command may include syntax of a general form write(T, FILENAME). The write(T, FILENAME) command may write a table (T) to the file FILENAME as column-oriented data.

Returning to FIG. 6, process 600 may include writing, based on the command, the heterogeneous table to the file with the file name and the file type (block 650). For example, the write table command (e.g., writetable) may cause client device 210/TCE 240 to write the heterogeneous table to the file. In some implementations, the file may include the file name (e.g., FILENAME) and the file type (e.g., FILETYPE) set forth in the write table command (e.g., writetable(T, FILENAME, 'FileType', FILETYPE)).

In some implementations, the writetable command may write the table to different file types. For example, the writetable command may cause client device 210/TCE 240 to write the table to a delimited text file (e.g., .txt, .dat, .csv, etc.) that is comma-delimited by default. The writetable command may create a column-oriented text file, where each column of each variable in a table (T) may be written as a column in the file. The table (T) variable names may be written as column headings in the first line of the file.

Optional parameter name/value pairs may be used to control how data is written to a delimited text file. For example, a Delimiter parameter may determine a delimiter used in the file. The delimiter may include ", '\t', ',', ';', '|' or corresponding string names (e g., 'space', 'tab', 'comma', 'semi', or 'bar'). A WriteVariableNames parameter may include a logical value that specifies whether or not the table (T) variable names are written as column headings. A WriteRowNames parameter may include a logical value that specifies whether or not the table (T) row names are written as a first column of the file. If the WriteVariableNames and WriteRowNames parameter values are both true, a first dimension name of the table may be written as the column heading for the first column of the file.

In some implementations, the writetable command may cause client device 210/TCE 240 to write the table to a column-oriented spreadsheet file (e.g., .xls, .xlsx, etc.) where each column of each variable in a table (T) may be written as a column in the file. The table (T) variable names may be written as column headings in a first row of the file.

Optional parameter name/value pairs may be used to control how data is written to a spreadsheet file. For example, a WriteVariableNames parameter may include a logical value that specifies whether or not the table (T) variable names are written as column headings. A WriteRowNames parameter may include a logical value that specifies whether or not the table (T) row names are written as a first column of the file. If the WriteVariableNames and WriteRowNames parameter values are both true, a first dimension name of the table (T) may be written as a column heading for the first column of the file. A Sheet parameter may identify a sheet to write and may be specified as a string that contains the spreadsheet name or a positive integer indicating a spreadsheet index. A Range parameter may include a string that specifies a rectangular portion of the spreadsheet to write.

In some implementations, the writetable command may cause client device 210/TCE 240 to write the table to a SAS XPORT file (e.g., .xpt) with one variable in the file for each variable in a table (T). Variables in the table (T) may include be column vectors.

Optional parameter name/value pairs may be used to control how data is written to an XPORT file. For example, a WriteRowNames parameter may include a logical value specifying whether or not to the table (T) row names are written to the file. If true, the writetable command may create a variable named ROWNAMES in the file.

In some cases, the writetable command may create a file that does not represent the table (T) exactly, as described below. For example, if the user utilizes table(filename) to read the file back into TCE 240 and creates a new table, a result may not have exactly the same format or content as the original table. The writetable command may write numeric variables using a format and categorical or character variables as unquoted strings. For non-character variables that have more than one column, the writetable command may write multiple delimiter-separated fields on each line, and may construct suitable column headings for the first line of the file. The writetable command may write variables, which have more than two dimensions, as two-dimensional variables with trailing dimensions collapsed. For cell-valued variables, the writetable command may write the content of each cell as a single row, in multiple delimiter-separated fields, when the content is numeric, logical, character, or categorical, and may write a single empty field otherwise.

As further shown in FIG. 6, process 600 may include storing the file (block 660). For example, client device 210/TCE 240 may store the written file in memory (e.g., main memory 330, FIG. 3). In some implementations, client device 210/TCE 240 may provide the written file for display to a user of client device 210/TCE 240.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Writing of A Table to A File and Manipulation of Tables

Figure 7A:
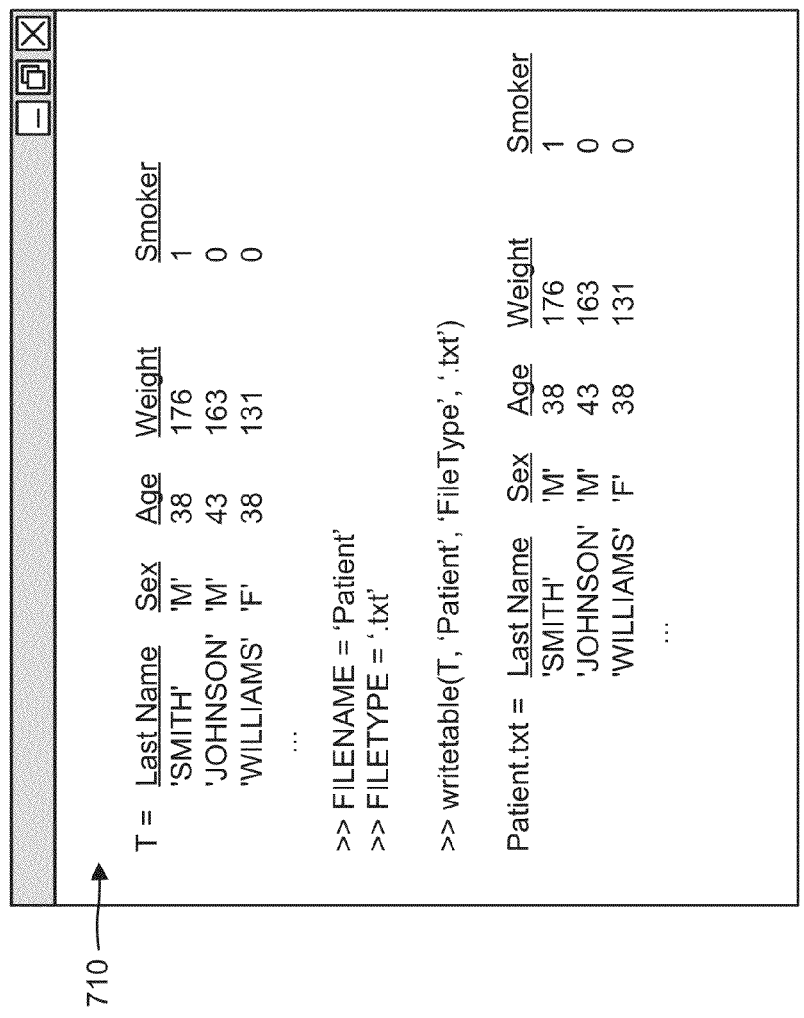

FIGS. 7A-7F are diagrams of an example 700 of the process described above with respect to FIG. 6. In the example 700, assume that client device 210/TCE 240 provides a user interface 710 for display to a user, as shown in FIG. 7A. User interface 710 may include, for example, a workspace of TCE 240. Further assume that client device 210/TCE 240 receives or retrieves a heterogeneous table (T) that includes multiple columns and rows. The user may instruct client device 210 to load the heterogeneous table into TCE 240 using a command (e.g., a 'load' command), and client device 210 may load the heterogeneous table into TCE 240 based on the command. As shown in FIG. 7A, client device 210/TCE 240 may provide the heterogeneous table (T) for display to the user, based on the command.

As further shown in FIG. 7A, assume that the user wants to write the table (T) to a text file named "Patient" since the table (T) may be associated with patient information. The user may input a file name (e.g., "Patient") and a file type (e.g., ".txt") for the file. In some implementations, the user may provide the file name and the file type as parameters within a writetable command. For example, as shown in FIG. 7A, the user may input the syntax writetable(T, 'Patient', 'FileType', '.txt'), which may cause client device 210/TCE 240 to write the table (T) to the text file named "Patient.txt." As further shown in FIG. 7A, client device 210/TCE 240 may provide the text file named "Patient.txt" for display to the user, which may include the same information as the table (T).

Figure 7B:
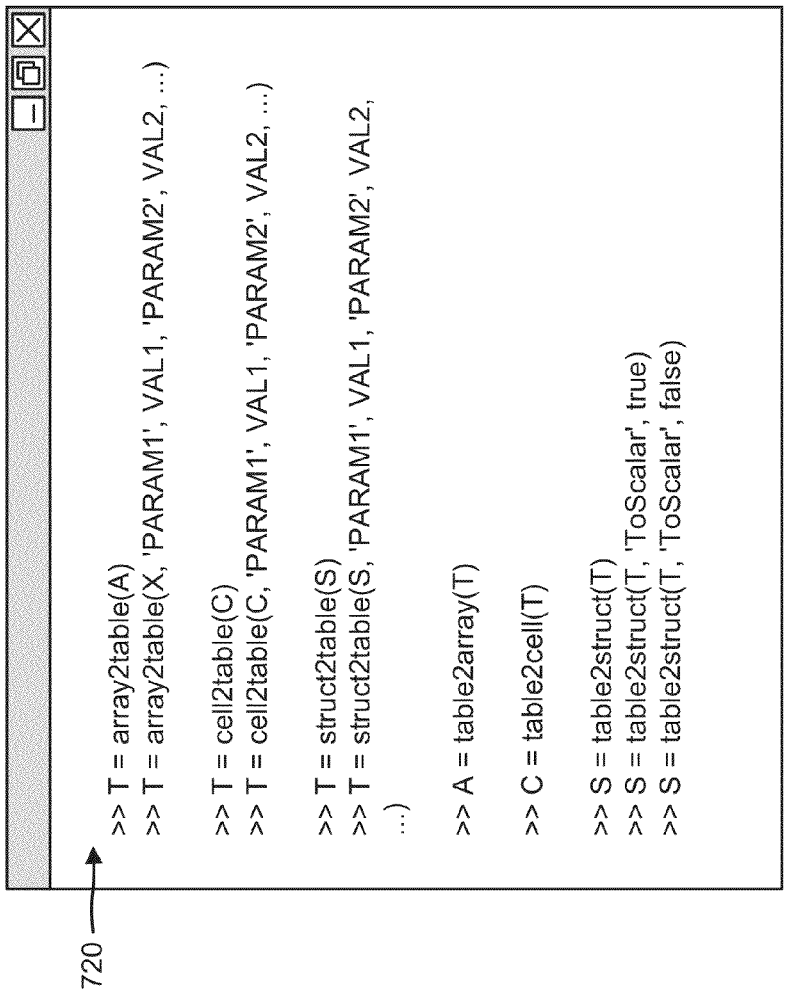

In example 700, assume that client device 210/TCE 240 provides a user interface 720 for display to the user, as shown in FIG. 7B. User interface 720 may include, for example, a workspace of TCE 240. The user may utilize client device 210/TCE 240 to provide construction and conversion table methods or functions. For example, the user may provide an array2table function that causes client device 210/TCE 240 to convert a matrix to a table. As shown in FIG. 7B, the user may provide syntax (e.g., T=array2table(A)) that causes client device 210/TCE 240 to convert an M-by-N array (A) to an M-by-N table (T). Each column of the array (A) may become a variable in the table (T). The array (A) may be any type of array, including a cell array. If the array (A) is a cell array, the user may want to use a cell2table function instead of the array2table function.

As further shown in FIG. 7B, the user may provide syntax (e.g., T=array2table(X, 'PARAM1', VAL1, 'PARAM2', VAL2, . . . )) specifying optional parameter name/value pairs that determine how data in an array (X) is converted. The parameters may include a VariableNames parameter that includes a cell array of strings containing variable names for the table (T). The parameters may include a RowNames parameter that includes a cell array of strings containing row names for the table (T).

In example 700, the user may provide a cell2table function that causes client device 210/TCE 240 to convert a cell array to a table. As shown in FIG. 7B, the user may provide syntax (e.g., T=cell2table(C)) that causes client device 210/TCE 240 to convert an M-by-N cell array (C) to an M-by-N table (T). The cell2table function may vertically concatenate the content of the cells in each column of the cell array (C) to create each variable in the table (T). If a column of the cell array (C) contains strings, then the corresponding variable in the table (T) may include a cell array of strings.

As further shown in FIG. 7B, the user may provide syntax (e.g., T=cell2table(C, 'PARAM1', VAL1, 'PARAM2', VAL2, . . . )) specifying optional parameter name/value pairs that determine how data in a cell array (C) is converted. The parameters may include a VariableNames parameter that includes a cell array of strings containing variable names for the table (T). The parameters may include a RowNames parameter that includes a cell array of strings containing row names for the table (T).

In example 700, the user may provide a struct2table function that causes client device 210/TCE 240 to convert a structure array to a table. As shown in FIG. 7B, the user may provide syntax (e.g., T=struct2table(S)) that causes client device 210/TCE 240 to convert a structure array (S) to a table (T). When the structure array (S) is a scalar structure with N fields, all of which have M rows, then the table (T) may include an M-by-N array. When the structure array (S) is a non-scalar structure array with M elements and N fields, then the table (T) may be M-by-N.

As further shown in FIG. 7B, the user may provide syntax (e.g., T=struct2table(S, 'PARAM1', VAL1, 'PARAM2', VAL2, . . . )) specifying optional parameter name/value pairs that determine how data in a structure array (S) is converted. The parameters may include a RowNames parameter that includes a cell array of strings containing row names for the table (T). The parameters may include an AsArray parameter that includes a logical value. Setting the AsArray parameter to true may cause the struct2table function to convert the structure array (S) to a table with length(S) rows, and to not treat a scalar structure specially as described above.

In example 700, the user may provide a table2array function that causes client device 210/TCE 240 to convert a table to a homogeneous array. As shown in FIG. 7B, the user may provide syntax (e.g., A=table2array(T)) that causes client device 210/TCE 240 to convert a table (T) to an array (A) whose type depends on the data in the table (T). Variables in the table (T) may include sizes and type that are compatible for horizontal concatenation. If the table (T) is an M-by-N table with variables that each have one column, then each variable may become one column in the array (A). Variables in the table (T) that have more than one column may become multiple columns in the array (A). The variables in the table (T) may include different numbers of columns. The variables in the table (T) may be N-D, but the variables may include the same size in dimensions higher than two. The table2array function may horizontally concatenate the variables in the table (T) to create the array (A).

In example 700, the user may provide a table2cell function that causes client device 210/TCE 240 to convert a table to a cell array. As shown in FIG. 7B, the user may provide syntax (e.g., C=table2cell(T)) that causes client device 210/TCE 240 to convert a table (T) to a cell array (C). Each variable in the table (T) may become one column of cells in the cell array (C). If the table (T) is an M-by-N array, then the cell array (C) may be M-by-N.

In example 700, the user may provide a table2struct function that causes client device 210/TCE 240 to convert a table to a structure array. As shown in FIG. 7B, the user may provide syntax (e.g., S=table2struct(T)) that causes client device 210/TCE 240 to convert a table (T) to a structure array (S). Each variable in the table (T) may become a field in the structure array (S). If the table (T) is an M-by-N array, then the structure array (S) may be M-by-1 and have N fields. The user may provide syntax (e.g., S=table2struct(T, 'ToScalar', true)) that causes client device 210/TCE 240 to convert the table (T) to a scalar structure (S). Each variable of the table (T) may become a field in the scalar structure (S). If the table (T) is an M-by-N array, then the scalar structure (S) may include N fields, each of which may have M rows. The user may also provide syntax (e.g., S=table2struct(T, 'ToScalar', false)) that may be identical to S=table2struct(T).

In example 700, assume that client device 210/TCE 240 provides a user interface 730 for display to the user, as shown in FIG. 7C. User interface 730 may include, for example, a workspace of TCE 240. The user may utilize client device 210/TCE 240 to provide set membership table methods. For example, the user may provide an ismember method that causes client device 210/TCE 240 to find rows in a table that occur in another table. As shown in FIG. 7C, the user may provide syntax (e.g., LIA=ismemeber(A, B)) that causes client device 210/TCE 240 to return a vector containing true if elements corresponding to rows in a table (A) that are also present in a table (B), and false otherwise. The table (A) and the table (B) may have the same variable names, except for order. The ismember(A, B) method may work on complete rows of tables (A) and (B), considering all of their variables. To find rows of the table (A) in the table (B) with respect to a subset of those variables, column subscripting may be used, such as ismember(A(:,VARS), B(:,VARS)), where VARS may be a positive integer, a vector of positive integers, a variable name, a cell array of variable names, or a logical vector. As further shown in FIG. 7C, the user may provide syntax (e.g., [LIA, LOCB]=ismember(A, B)) that causes client device 210/TCE 240 to returns a vector (LOCB) containing an index to a first row in a table (B) that corresponds to each row in a table (A), or a zero if there is no such row.

In example 700, the user may provide a unique method that causes client device 210/TCE 240 to find unique rows in a table. As shown in FIG. 7C, the user may provide syntax (e.g., C=unique(A)) that causes client device 210/TCE 240 to return a table (C) that contains sorted unique rows in a table (A). The table (A) may contain only variables whose class has a unique method. For example, the variables may include variables that are numeric, character, logical, categorical, or a cell array of strings. The unique(A) method may work on complete rows of the table (A), considering all of the table variables. To find unique rows with respect to a subset of the table variables, column subscripting may be used, such as unique(A(:,VARS)), where VARS is a positive integer, a vector of positive integers, a variable name, a cell array of variable names, or a logical vector.

As further shown in FIG. 7C, the user may provide syntax (e.g., [C, IA, IC]=unique(A)) that causes client device 210/TCE 240 to return column index vectors (IA) and (IC) for a table (C), such that C=A(IA,:) and A=C(IC,:). The user may provide syntax (e.g., [C, IA, IC]=unique(A, OCCURRENCE)) that causes client device 210/TCE 240 to specify which index is returned in a column index vector (IA) in the case of repeated rows in table (A). A default value may include OCCURENCE='first', which may return the index of the first occurrence of each repeated row in the table (A), while OCCURRENCE='last' may return the index of the last occurrence of each repeated row in the table (A). The user may provide syntax (e.g., [C, IA, IC]=unique(A, 'stable')) that causes client device 210/TCE 240 to return the rows of a table (C) in the same order that the rows appear in a table (A). The user may also provide syntax (e.g., [C, IA, IC]=unique (A, 'sorted')) that causes client device 210/TCE 240 to returns the rows of a table (C) in sorted order.

In example 700, the user may provide a union method that causes client device 210/TCE 240 to find rows that occur in either of two tables. As shown in FIG. 7C, the user may provide syntax (e.g., C=union(A, B)) that causes client device 210/TCE 240 to, for tables (A) and (B), return a combined set of rows from two arrays, with repetitions removed, to sorted rows in a table (C). Tables (A) and (B) must have the same variable names, except for order. The union(A, B) method may work on complete rows of tables (A) and (B), considering all of the table variables. To find a union with respect to a subset of the table variables, column subscripting may be used, such as union(A(:,VARS),B(:,VARS)), where VARS is a positive integer, a vector of positive integers, a variable name, a cell array of variable names, or a logical vector.

As further shown in FIG. 7C, the user may provide syntax (e.g., [C, IA, IB]=union(A, B)) that causes client device 210/TCE 240 to return index vectors (IA) and (IB) such that a table (C) is a sorted combination of values A(IA,:) and B(IB,:). If there are common rows in tables (A) and (B), then only the index from the table (A) may be returned, in the index vector (IA). If there are repeated rows in tables (A) or (B), then an index of a first occurrence may be returned. The user may provide syntax (e.g., [C, . . . ]=union(A, B, 'stable')) that causes client device 210/TCE 240 to return rows in a table (C) in a same order that the rows appear in a table (A), then a table (B). The user may also provide syntax (e.g., [C, . . . ]=union (A, B, 'sorted')) that causes client device 210/TCE 240 to return rows in a table (C) in a sorted order.

In example 700, the user may provide an intersect method that causes client device 210/TCE 240 to find rows common to two tables. As shown in FIG. 7C, the user may provide syntax (e.g., C=intersect(A, B)) that causes client device 210/TCE 240 to return a common set of rows from tables (A) and (B), with repetitions removed. The rows in a table (C) may be in sorted order. Tables (A) and (B) may have the same variable names, except for order. The intersect(A, B) method may work on complete rows of tables (A) and (B), considering all of the table variables. To find an intersection with respect to a subset of the table variables, column subscripting may be used, such as intersect(A(:,VARS),B(:,VARS)), where VARS is a positive integer, a vector of positive integers, a variable name, a cell array of variable names, or a logical vector.

As shown in FIG. 7C, the user may provide syntax (e.g., [C, IA, IB]=intersect(A, B)) that causes client device 210/TCE 240 to return index vectors (IA) and (IB) such that C=A(IA,:) and C=B(IB,:). If there are repeated rows in tables (A) or (B), then an index of a first occurrence may be returned. The user may provide syntax .e.g., [C, . . . ]=intersect(A, B, 'stable')) that causes client device 210/TCE 240 to return rows in a table (C) in a same order that the rows appear in a table (A). The user may also provide syntax (e.g., [C, . . . ]=intersect(A, B, 'sorted')) that causes client device 210/TCE 240 to return rows in a table (C) in a sorted order.

Figure 7D:
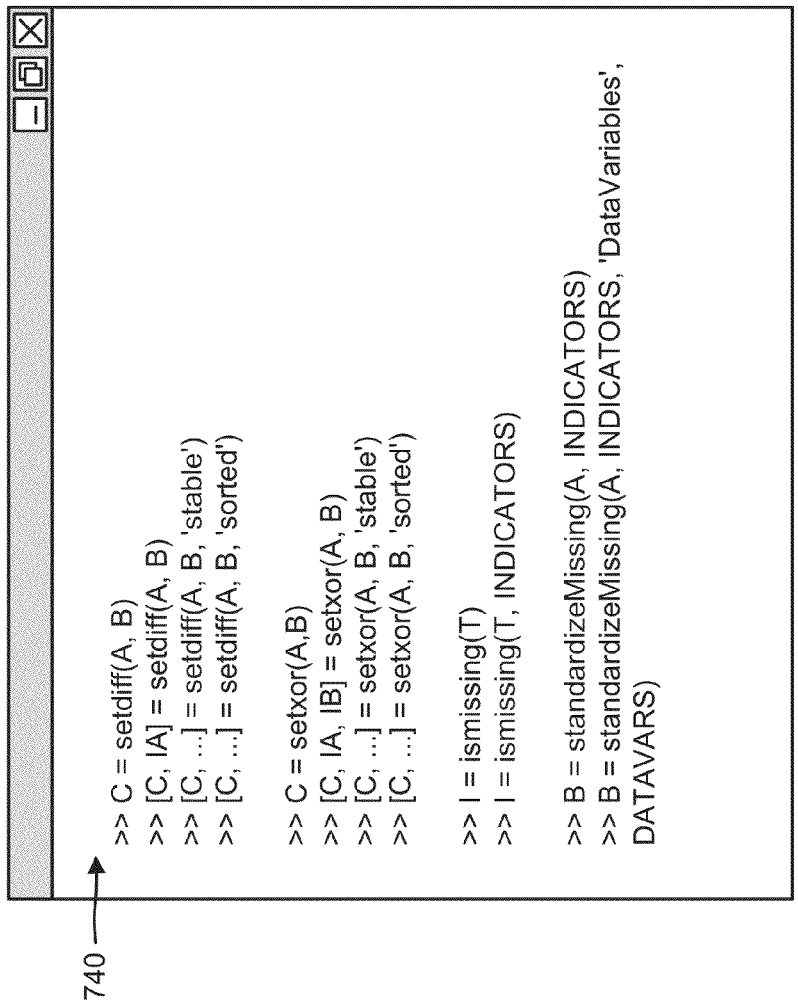

In example 700, assume that client device 210/TCE 240 provides a user interface 740 for display to the user, as shown in FIG. 7D. User interface 740 may include, for example, a workspace of TCE 240. The user may utilize client device 210/TCE 240 to provide set membership and data organization table methods. For example, the user may provide a setdiff method that causes client device 210/TCE 240 to find rows that occur in one table but not in another table. As shown in FIG. 7D, the user may provide syntax (e.g., C=setdiff(A, B)) that causes client device 210/TCE 240 to return a set of rows that are in a table (A) but are not in a table (B), with repetitions removed. The rows in a table (C) may be in a sorted order. Tables (A) and (B) may have the same variable names, except for order. The setdiff(A, B) method may work on complete rows of tables (A) and (B), considering all of table variables. To find a set difference with respect to a subset of the table variables, column subscripting may be used, such as setdiff(A(:,VARS),B(:,VARS)), where VARS is a positive integer, a vector of positive integers, a variable name, a cell array of variable names, or a logical vector.

As further shown in FIG. 7D, the user may provide syntax (e.g., [C, IA]=setdiff(A, B)) that causes client device 210/TCE 240 to return an index vector (IA) such that C=A(IA,:). If there are repeated rows in a table (A), then an index of a first occurrence may be returned. The user may provide syntax (e.g., [C, . . . ]=setdiff(A, B, 'stable')) that causes client device 210/TCE 240 to return rows in a table (C) in a same order that the rows appear in a table (A). The user may provide syntax (e.g., [C, . . . ]=setdiff(A, B, 'sorted')) that causes client device 210/TCE 240 to return rows in a table (C) in a sorted order.

In example 700, the user may provide a setxfor method that causes client device 210/TCE 240 to find rows that occur in one of two tables, but not in both tables. As shown in FIG. 7D, the user may provide syntax (e.g., C=setxor(A, B)) that causes client device 210/TCE 240 to return a set of rows that are not in an intersection of two tables (A) and (B), with repetitions removed. The rows in a table (C) may be sorted. Tables (A) and (B) may have the same variable names, except the order. The setxor(A, B) method may work on complete rows of tables (A) and (B), considering all of the table variables. To find the exclusive or with respect to a subset of the table variables, column subscripting may be used, such as setxfor(A):, VARS), B(:, VARS)), where VARS may include a positive integer, a vector of positive integers, a variable name, a cell array of variable names, or a logical vector.

As further shown in FIG. 7D, the user may provide syntax (e.g., [C, IA, IB]=setxor(A, B)) that causes client device 210/TCE 240 to return index vectors (IA) and (IB) such that a table (C) may be a sorted combination of values A(IA,:) and B(IB,:). If there are repeated rows in tables (A) or (B), then an index of a first occurrence may be returned. The user may provide syntax (e.g., [C, . . . ]=setxor(A, B, 'stable')) that causes client device 210/TCE 240 to return the rows in a table (C) in the same order that the rows appear in tables (A) and (B). The user may also provide syntax (e.g., [C, . . . ]=setxor (A, B, 'sorted')) that causes client device 210/TCE 240 to return the rows in a table (C) in a sorted order.

In example 700, the user may provide an ismissing method that causes client device 210/TCE 240 to find elements in a table that contains missing values. As shown in FIG. 7D, the user may provide syntax (e.g., I=ismissing(T)) that causes client device 210/TCE 240 to return a logical array (I) that indicates which elements in a table (T) contain a missing value. The ismissing method may recognize NaN as indicating missing data for floating point types, categorical types, an empty string for a cell array of strings, and blank strings for character arrays. As further shown in FIG. 7D, the user may provide syntax (e.g., I=ismissing(T, INDICATORS)) that causes client device 210/TCE 240 to treat the values in INDICATORS as missing value indicators. INDICATORS may include a numeric vector, a string, or a cell array containing numeric values and strings. The ismissing method may check numeric variables in a table (T) against numeric values from INDICATORS, and string and categorical variables in the table (T) against strings from INDICATORS.

In some implementations, the ismissing method may determine positions of missing data in table differently if the missing data is text or numbers. The ismissing method may provide separate arguments for text and numeric data, which may make it easier to use and understand than typical arrangements.

In example 700, the user may provide a standardizeMissing method that causes client device 210/TCE 240 to insert standard missing data indicators into a table. As shown in FIG. 7D, the user may provide syntax (e.g., B=standardizeMissing(A, INDICATORS)) that causes client device 210/TCE 240 to replace any values specified in INDICATORS that appear in floating point, categorical, or string variables in the table (A) with NaN or an empty string. INDICATORS may include a numeric vector, a string, or a cell array containing numeric values and strings. The standardizeMissing method may check floating point variables in a table (A) against numeric values from INDICATORS, and string and categorical variables in the table (A) against strings from INDICATORS. As further shown in FIG. 7D, the user may provide syntax (e.g., B=standardizeMissing(A, INDICATORS, 'DataVariables', DATAVARS)) that causes client device 210/TCE 240 to replace values only in specified table variables. DATAVARS may include a positive integer, a vector of positive integers, a variable name, a cell array containing one or more variable names, or a logical vector.

Figure 7E:
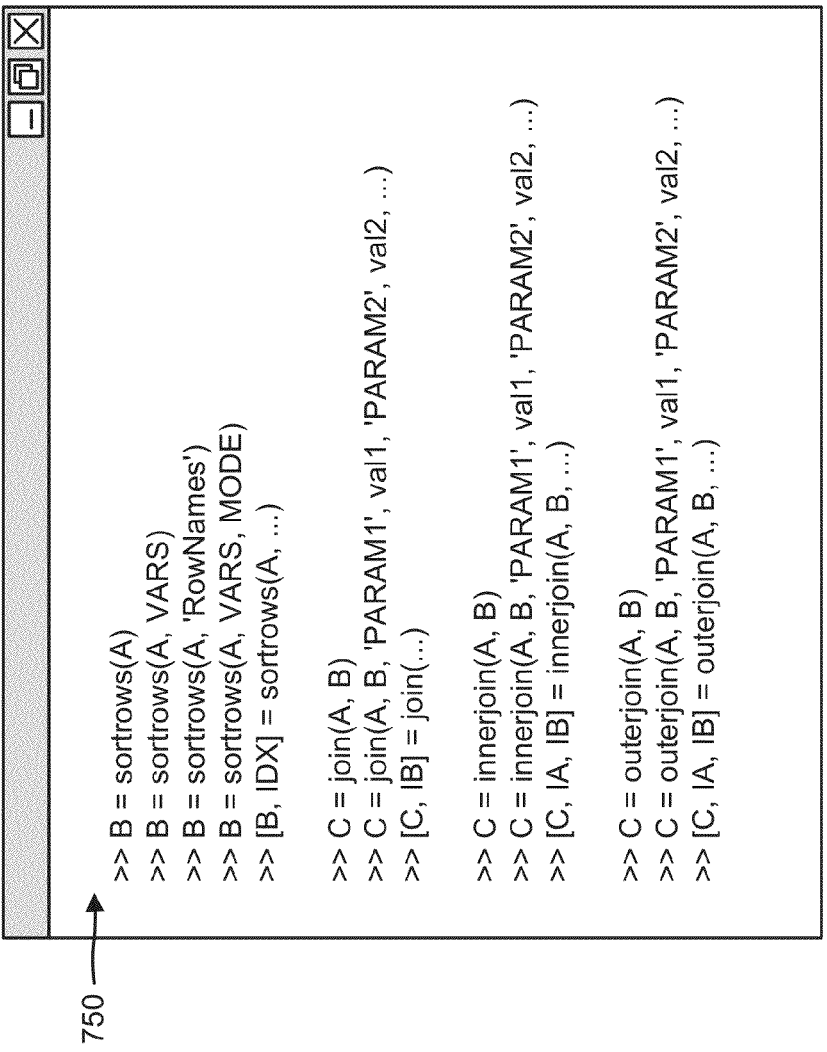

In example 700, assume that client device 210/TCE 240 provides a user interface 750 for display to the user, as shown in FIG. 7E. User interface 750 may include, for example, a workspace of TCE 240. The user may utilize client device 210/TCE 240 to provide set membership and data organization table methods. For example, the user may provide a sortrows method that causes client device 210/TCE 240 to sort rows of a table. As shown in FIG. 7E, the user may provide syntax (e.g., B=sortrows(A)) that causes client device 210/TCE 240 to return a copy of a table (A), with the rows sorted in ascending order by all of the variables in the table (A). The rows in a table (B) may be sorted first by a first variable, next by a second variable, and so on. Each variable in the table (A) may be a valid input to the sort method.

As further shown in FIG. 7E, the user may provide syntax (e.g., B=sortrows(A, VARS) that causes client device 210/TCE 240 to sort rows in a table (A) by variables specified by VARS. VARS may include a positive integer, a vector of positive integers, a variable name, a cell array containing one or more variable names, or a logical vector. VARS may include a mix of positive and negative integers. If an element of VARS is positive, a corresponding variable in the table (A) may be sorted in ascending order. If an element of VARS is negative, a corresponding variable in the table (A) may be sorted in descending order. These signs may be ignored if the user provides a MODE input, described below. The user may provide syntax (e.g., B=sortrows(A, 'RowNames')) that causes client device 210/TCE 240 to sort rows in a table (A) by row names.

As further shown in FIG. 7E, the user may provide syntax (e.g., B=sortrows(A, VARS, MODE)) that causes client device 210/TCE 240 to sort a table (A) in a direction(s) specified by a MODE. When the MODE is 'ascend' (the default) or 'descend', the sortrows method may sort the table (A) in ascending or descending order, respectively, for all variables specified by the VARS. The MODE may also be a cell array containing the strings 'ascend' or 'descend' to specify a different direction for each variable specified by the VARS. The user may also provide syntax (e.g., [B, IDX] =sortrows(A, . . . )) that causes client device 210/TCE 240 to return an index vector (IDX) such that B=A(IDX,:).

In example 700, the user may provide a join method that causes client device 210/TCE 240 to merge two tables by matching up rows using key variables. As shown in FIG. 7E, the user may provide syntax (e.g., C=join(A, B)) that causes client device 210/TCE 240 to create a table (C) by merging rows from two tables (A) and (B). The join method may perform a simple form of join operation where each row of the table (A) may match exactly one row in the table (B). If necessary, the join method may replicate rows of the table (B) and populates them in the table (A). The join method may first find one or more key variables. A key may include a variable that occurs in both tables (A) and (B) with the same name. Each row of the table (B) may contain a unique combination of values in the key variables, and the table (B) may contain all combinations of key values that are present in keys of the table (A). The join method may use the key variables to find the row in the table (B) that matches each row in the table (A), and combines those rows to create a row in the table (C). The table (C) may include one row for each row in the table (A), appearing in the same order as rows in the table (A). The table (C) may include all variables from the table (A), as well as all of the non-key variables from the table (B). If tables (A) and (B) contain variables with identical names, the join method may add a unique suffix to the corresponding variable names in the table (C).

As further shown in FIG. 7E, the user may provide syntax (e.g., C=join(A, B, 'PARAM1', val1, 'PARAM2', val2, . . . )) specifying optional parameter name/value pairs to control how the join method uses the variables in the tables (A) and (B). The parameters may include a Keys parameter that specifies variables to use as keys. The parameters may include a LeftKeys parameter that specifies variables to use as keys in the table (A). The parameters may include a RightKeys parameter that specifies variables to use as keys in the table (B). The user may provide either the Keys parameter, or both the LeftKeys and RightKeys parameters. A value for these parameters may include a positive integer, a vector of positive integers, a variable name, a cell array of variable names, or a logical vector. The LeftKeys or RightKeys parameters may both specify a same number of key variables, and the left and right keys may be paired in the order specified.

The parameters may include a LeftVarialbes parameter that specifies which variables from the table (A) to include in the table (C). By default, the join method may include all variables from the table (A). The parameters may include a RightVariables parameter that specifies which variables from the table (B) to include in the table (C). By default, the join method may include all variables from the table (B) except the key variables. The LeftVariables or RightVariables parameters may be used to include or exclude key variables as well as data variables. The value for these parameters may include a positive integer, a vector of positive integers, a variable name, a cell array containing one or more variable names, or a logical vector. The parameters may also include a KeepOneCopy parameter that specifies variables for which join retains only a copy of the table (A). The KeepOneCopy parameter may include a variable name or a cell array containing one or more variable names.

As further shown in FIG. 7E, the user may provide syntax (e.g., [C, IB]=join(. . . )) that causes client device 210/TCE 240 to return an index vector (IB), where the join method may construct the table (C) by horizontally concatenating A(:, LEFTVARS) and B(IB, RIGHTVARS).

In example 700, the user may provide an innerjoin method that causes client device 210/TCE 240 to perform an inner join between two tables. As shown in FIG. 7E, the user may provide syntax (e.g., C=innerjoin(A, B)) that causes client device 210/TCE 240 to create a table (C) as an inner join between two tables (A) and (B). An inner join may retain only the rows that match between tables (A) and (B). The innerjoin method may find one or more key variables that occur in both the tables (A) and (B) with the same name. The innerjoin method may use those key variables to match up rows between the tables (A) and (B). The table (C) may contain one row for each pair of rows in the tables (A) and (B) that share the same combination of key variables. In general, if there are M rows in the table (A) and N rows in the table (B) that all contain the same combination of key variables, the table (C) may include M×N rows for that combination. The innerjoin method may sort the rows in the table (C) by the key variables.

The table (C) may include all variables from both the tables (A) and (B), but only one copy of the key variables. If the tables (A) and (B) contain variables with identical names, the innerjoin method may add a unique suffix to the corresponding variable names in the table (C).

As further shown in FIG. 7E, the user may provide syntax (e.g., C=innerjoin(A, B, 'PSTSM1', val1, 'PARAM2', val2, . . . )) specifying optional parameter name/value pairs to control how the innerjoin method uses the variables in the tables (A) and (B). The parameters may include a Keys parameter that specifies variables to use as keys. The parameters may include a LeftKeys parameter that specifies variables to use as keys in the table (A). The parameters may include a RightKeys parameter that specifies variables to use as keys in the table (B). The user may provide either the Keys parameter, or both the LeftKeys and RightKeys parameters. A value for these parameters may include a positive integer, a vector of positive integers, a variable name, a cell array of variable names, or a logical vector. The LeftKeys or RightKeys parameters may both specify a same number of key variables, and the left and right keys may be paired in the order specified.

The parameters may include a LeftVariables parameter that specifies which variables from the table (A) to include in the table (C). By default, the innerjoin method may include all variables from the table (A). The parameters may include a RightVariables parameter that specifies which variables from the table (B) to include in the table (C). By default, the innerjoin method may include all variables from the table (B) except the key variables. The LeftVariables or RightVariables parameters may be used to include or exclude key variables as well as data variables. The value for these parameters may include a positive integer, a vector of positive integers, a variable name, a cell array containing one or more variable names, or a logical vector.

As further shown in FIG. 7E, the user may provide syntax (e.g., [C, IA, IB]=innerjoin(A, B, . . . )) that causes client device 210/TCE 240 to return index vectors (IA) and (IB) indicating the correspondence between rows in the table (C) and the rows in the tables (A) and (B). The innerjoin method may construct the table (C) by horizontally concatenating A(IA, LEFTVARS) and B(IB, RIGHTVARS).

In example 700, the user may provide an outerjoin method that causes client device 210/TCE 240 to perform an outer join between two tables. As shown in FIG. 7E, the user may provide syntax (e.g., C=outerjoin(A, B)) that causes client device 210/TCE 240 to create a table (C) as an outer join between two tables (A) and (B). An outer join may include the rows that match between tables (A) and (B) and also unmatched rows from tables (A) and (B). The outerjoin method may find one or more key variables that occur in both the tables (A) and (B) with the same name. The outerjoin method may use those key variables to match up rows between the tables (A) and (B). The table (C) may contain one row for each pair of rows in the tables (A) and (B) that share the same combination of key variables. In general, if there are M rows in the table (A) and N rows in the table (B) that all contain the same combination of key variables, the table (C) may include M×N rows for that combination. The table (C) may include rows corresponding to key combinations in table (A) or (B) that did not match any row in table (B) or (A). The outerjoin method may sort the rows in the table (C) by the key variables.

The table (C) may include all variables from both the tables (A) and (B), but only one copy of the key variables. If the tables (A) and (B) contain variables with identical names, the outerjoin method may add a unique suffix to the corresponding variable names in the table (C). Variables in the table (C) that came from table (A) or (B) may include null values in those rows that had no match from table (B) or (A).

As further shown in FIG. 7E, the user may provide syntax (e.g., C=outerjoin(A, B, 'PARAM1', val1, 'PARAM2', val2, . . . )) specifying optional parameter name/value pairs to control how the outerjoin method uses the variables in the tables (A) and (B). The parameters may include a Keys parameter that specifies variables to use as keys. The parameters may include a LeftKeys parameter that specifies variables to use as keys in the table (A). The parameters may include a RightKeys parameter that specifies variables to use as keys in the table (B). The user may provide either the Keys parameter, or both the LeftKeys and RightKeys parameters. A value for these parameters may include a positive integer, a vector of positive integers, a variable name, a cell array of variable names, or a logical vector. The LeftKeys or RightKeys parameters may both specify a same number of key variables, and the left and right keys may be paired in the order specified.

The parameters may include a MergeKeys that specifies if the outerjoin method should include a single variable in the table (C) for each key variable pair from tables (A) and (B), rather than including two separate variables. The outerjoin method may create the single variable by merging the key variables from tables (A) and (B), taking values from the table (A) where a corresponding row exists in the table (A), and from the table (B) otherwise. When the MergeKeys parameter is set to true, the outerjoin may include all key variables in the table (C).

The parameters may include a LeftVariables parameter that specifies which variables from the table (A) to include in the table (C). By default, the outerjoin method may include all variables from the table (A). The parameters may include a RightVariables parameter that specifies which variables from the table (B) to include in the table (C). By default, the outerjoin method may include all variables from the table (B). The LeftVariables or RightVariables parameters may be used to include or exclude key variables as well as data variables. The value for these parameters may include a positive integer, a vector of positive integers, a variable name, a cell array containing one or more variable names, or a logical vector. The parameters may include a Type parameter that specifies a type of outer join operation (e.g., either 'full', 'left', or 'right'). For a left (or right) outer join, the table (C) may include rows corresponding to keys in table (A) or (B) that did not match any keys in table (B) or (A), but not vice-versa.

As further shown in FIG. 7E, the user may provide syntax (e.g., [C, IA, IB]=outerjoin(A, B, . . . )) that causes client device 210/TCE 240 to return index vectors (IA) and (IB) indicating the correspondence between rows in the table (C) and the rows in the tables (A) and (B). The outerjoin method may construct the table (C) by horizontally concatenating A(IA, LEFTVARS) and B(IB, RIGHTVARS).

In some implementations, the join, innerjoin, and outerjoin methods may be separate methods, whereas typical arrangements combine the functionality of these three methods into a single method. The single method may make the functionality difficult to discover for users, whereas the three separate methods may be easier to locate and understand by users.

In example 700, assume that client device 210/TCE 240 provides a user interface 760 for display to the user, as shown in FIG. 7F. User interface 760 may include, for example, a workspace of TCE 240. The user may utilize client device 210/TCE 240 to provide set data organization and computation table methods. For example, the user may provide a stack method that causes client device 210/TCE 240 to stack data from multiple variables into a single variable. As shown in FIG. 7F, the user may provide syntax (e.g., TALL=stack(WIDE, DATAVARS)) that causes client device 210/TCE 240 to convert a table (WIDE) to an equivalent table (TALL) that is in a "tall format", by "stacking up" multiple variables in the WIDE table into a single variable in the TALL table. In general, the TALL table may include fewer variables, but more rows, than the WIDE table. A DATAVARS parameter may specify a group of M data variables in the WIDE table. The stack method may create a single data variable in the TALL table by interleaving their values, and if the WIDE table has N rows, then the TALL table may include M×N rows. In other words, the stack methods may takes the M data values from each row in the WIDE table and stacks them up to create M rows in the TALL table. The DATAVARS parameter may include a positive integer, a vector of positive integers, a variable name, a cell array containing one or more variable names, or a logical vector. The stack method may also create a new variable in the TALL table to indicate to which of the M data variables in the WIDE table each row in the TALL table corresponds.

The stack method may assign values for per-variable properties (e.g., VariableUnits and VariableDescriptions) for the new data variable in the TALL table from the corresponding property values for the first variable listed in DATAVARS. The stack method may copy the remaining variables from the WIDE table to the TALL table without stacking, by replicating each of their values M times.

As shown in FIG. 7F, the user may provide syntax (e.g., [TALL, IWIDE]=stack(WIDE, DATAVARS)) that causes client device 210/TCE 240 to return an index vector (IWIDE) indicating correspondence between rows in the TALL table and rows in the WIDE table. The stack method may create "tall" rows TALL(WIDE==I,:) using a "wide" row WIDE (I,:). In other words, the stack may create TALL(J,:) using WIDE(IWIDE(J), DATAVARS).

Parameter name/value pairs may be used to control how variables in the WIDE table are converted to variables in the TALL table. The parameters may include a ConstantVariables parameter that defines variables in the WIDE table to be copied to the TALL table without stacking. The ConstantVariables parameter may include a positive integer, a vector of positive integers, a variable name, a cell array containing one or more variable names, or a logical vector. The parameters may include a NewDataVariableName parameter that defines a name for the data variable to be created in the TALL table. The parameters may include an IndexVariableName parameter that defines a name for a new variable to be created in the TALL table that indicates a source of each value in the new data variable.

In example 700, the user may provide an unstack method that causes client device 210/TCE 240 to unstack data from a single variable into multiple variables. As shown in FIG. 7F, the user may provide syntax (e.g., WIDE=unstack(TALL, DATAVAR, INDVAR)) that causes client device 210/TCE 240 to convert a TALL table to an equivalent WIDE table that is in a wide format, by unstacking a single variable in the TALL table into multiple variables in the WIDE table. In general, the WIDE table may include more variables, but fewer rows, than the TALL table. A DATAVAR may specify a data variable in the TALL table to unstack. An INDVAR parameter may specify an indicator variable in the TALL table that determines which variable in the WIDE table each value in DATAVAR is unstacked into, as described below. The unstuck method may treat the remaining variables in the TALL table as grouping variables. Each unique combination of their values may define a group of rows in the TALL table that will be unstacked into a single row in the WIDE table.

The unstack method may create M data variables in the WIDE table, where M may include a number of unique values in INDVAR. The values in INDVAR may indicate which of those M variables receive which values from DATAVAR. A J-th data variable in the WIDE table may include values from DATAVAR that correspond to rows whose INDVAR value is a J-th of the M possible values. Elements of those M variables, for which no corresponding data value in the TALL table exists, may include a default value. The DATAVAR parameter and the INDVAR parameter may include a positive integer, a variable name, or a logical vector containing a single true value.

As shown in FIG. 7F, the user may provide syntax (e.g., [WIDE, ITALL]=unstack(TALL, DATAVAR, INDVAR)) that causes client device 210/TCE 240 to return an index vector (ITALL) indicating a correspondence between rows in the WIDE table and rows in the TALL table. For each row in the WIDE table, ITALL may include an index of the first in the corresponding group of rows in the TALL table.

Parameter name/value pairs may be used to control how variables in the TALL table are converted to variables in the WIDE table. For example, the parameters may include a GroupingVariables parameter that groups variables in the TALL table that define groups of rows. The GroupingVariables parameter may include a positive integer, a vector of positive integers, a variable name, a cell array containing one or more variable names, or a logical vector. The parameters may include a ConstantVariables parameter that defines variables in the TALL table to be copied to the WIDE table without unstacking. The values for these variables in the WIDE table may be taken from the first row in each group in the TALL table. The ConstantVariables parameter may include a positive integer, a vector of positive integers, a variable name, a cell array containing one or more variable names, or a logical vector. The parameters may include a NewDataVariableNames parameter that includes a cell array of strings containing names for the data variables to be created in the WIDE table. The parameters may include an AggregationFunction parameter that includes a function handle that accepts a subset of values from DATAVAR and returns a single value. The unstack method may apply this function to rows from a same group that have the same value of INDVAR.

In some implementations, the stack and unstuck methods may not be abbreviated like typical arrangements, which may make these methods easier to understand and use.

In example 700, the user may provide a rowfun method that causes client device 210/TCE 240 to apply a function to rows of a table. As shown in FIG. 7F, the user may provide syntax (e.g., B=rowfun(FUN, A)) that causes client device 210/TCE 240 to apply a function (FUN) to each row of a table (A), and returns the results to a table (B). The table (B) may include one variable for each output of the FUN function. The FUN function may accept M separate inputs. As further shown in FIG. 7F, the user may provide syntax (e.g., B=rowfun(FUN, A, 'PARAM1', val1, 'PARAM2', val2, . . . )) specifying optional parameter name/value pairs to control how the rowfun method uses the variables in the table (A) and how it calls the FUN function.

The parameters may include an InputVariables parameter that specifies which variables in the table (A) are inputs to FUN, and a GroupingVariables parameter that specifies one or more variables in the table (A) that define groups of rows. Each group may include rows in the table (A) that have the same combination of values in those variables. The rowfun method may apply FUN to each group of rows, rather than separately to each row of the table (A). The table (B) may include one row for each group. The GroupingVariables and InputVariables parameters may include a positive integer, a vector of positive integers, a variable name, a cell array containing one or more variable names, or a logical vector. The InputVariables parameter may also be a function handle.

The parameters may include a SeparateInputs parameter that specifies whether FUN expects separate inputs, or one vector containing all inputs. When true (the default), the rowfun method may call FUN with one argument for each data variable. When false, the rowfun method may create an input vector to FUN by concatenating the values in each row of the table (A). The parameters may include an ExtractCellContents parameter that, when true, causes the rowfun method to extract content of cell variables in the table (A) and passes the values, rather than the cells, to FUN. The parameters may include an OutputVariableNames parameter that specifies the variable names for the outputs of FUN, a NumOutputs parameter that specifies the number of outputs from FUN, and an OutputFormat parameter that specifies the form in which the rowfun method returns the values computed by FUN. The form may include uniform (e.g., where the rowfun method concatenates the values into a vector); table (e.g. where the rowfun method returns a table with one variable for each output of FUN); cell (e.g., where table (B) is a cell array); etc. The parameters may also include an ErrorHandler parameter (e.g., a function handle) that specifies a function that the rowfun method is to call if a call to FUN fails.

In example 700, the user may provide a varfun method that causes client device 210/TCE 240 to apply a function to each variable of a table. As shown in FIG. 7F, the user may provide syntax (e.g., B=varfun(FUN, A)) that causes client device 210/TCE 240 to apply the function FUN separately to each variable of the table (A), and returns the results in the table (B). FUN may include a function handle to a function that takes one input argument and returns arrays with the same number of rows each time it is called. As further shown in FIG. 7F, the user may provide syntax (e.g., B=varfun(FUN, A, 'PARAM1', val1, 'PARAM2', val2, . . . )) specifying optional parameter name/value pairs to control how the varfun method uses the variables in the table (A) and how it calls the FUN function.

The parameters may include an InputVariables parameter that specifies which variables in the table (A) are apply to FUN, and a GroupingVariables parameter that specifies one or more variables in the table (A) that define groups of rows. Each group may include rows in the table (A) that have the same combination of values in those variables. The varfun method may apply FUN to each group of rows, rather than separately to each row of the table (A). The table (B) may include one row for each group. The GroupingVariables and InputVariables parameters may include a positive integer, a vector of positive integers, a variable name, a cell array containing one or more variable names, or a logical vector. The InputVariables parameter may also be a function handle.

The parameters may an OutputFormat parameter that specifies the form in which the varfun method returns the values computed by FUN. The form may include uniform (e.g., where the varfun method concatenates the values into a vector); table (e.g. where the varfun method returns a table with one variable for each variable of FUN); cell (e.g., where table (B) is a cell array); etc. The parameters may also include an ErrorHandler parameter (e.g., a function handle) that specifies a function that the rowfun method is to call if a call to FUN fails.

CONCLUSION

Systems and/or methods described herein may provide a table API that creates a table. The table may provide heterogeneous data and/or metadata, such as, for example, variable and row names, in a single data container. The table may store column-oriented or tabular data (e.g., stored as columns in a text file, spreadsheet, etc.), and may accommodate variables of different types, sizes, units, etc.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, executed on a device, comprising:
   receiving, in a technical computing environment (TCE), a first variable with a first data type and a particular number of rows,
      the receiving the first variable being performed by the device;
   receiving a second variable with a second data type and the particular number of rows,
      the second data type being different than the first data type, and
      the receiving the second variable being performed by the device;
   receiving a command to create a table based on the first variable and the second variable,
      the command including a syntax of:
         table(VAR1, VAR2),
      where table corresponds to the command, VAR1 corresponds to the first variable, and VAR2 corresponds to the second variable, and
      the receiving the command being performed by the device;
   creating, based on the command, a heterogeneous table that includes the first variable and the second variable,
      the creating the heterogeneous table being performed by the device; and
   storing the heterogeneous table,
      the storing the heterogeneous table being performed by the device.

2. The method of claim 1, further comprising:
   providing the heterogeneous table for display.

3. The method of claim 1, further comprising:
   receiving variable names for the first variable and the second variable; and
   receiving row names for rows of the first variable and rows of the second variable
      where creating the heterogeneous table comprises;
         creating the heterogeneous table based on the command, the variable names, and the row names,
            the heterogeneous table including the variable names for columns of the heterogeneous table, and
            the heterogeneous table including the row names for rows of the heterogeneous table.

4. The method of claim 1, further comprising:
   receiving a file name for a file;
   receiving a file type associated with the file;
   receiving another command to write the heterogeneous table to the file;
   writing, based on the other command, the heterogeneous table to the file with the file name and the file type; and
   storing the file.

5. The method of claim 4, where the other command includes a syntax of:

writetable(T, FILENAME, FILETYPE), and
where writetable corresponds to the other command, T corresponds to the heterogeneous table, FILENAME corresponds to the file name, and FILETYPE corresponds to the file type.

6. The method of claim 5, where the file type indicates a default file type.

7. The method of claim 4, where the file type includes one of:
    a text file type,
    a spreadsheet file type, or
    an xport file type.

8. The method of claim 1, further comprising:
    receiving a file name for a file,
    receiving a file type associated with the file,
    receiving another command to read the heterogeneous table from the file, and
    reading, based on the other command, the heterogeneous table from the file with the file name and the file type.

9. The method of claim 8,
    where the other command includes a syntax of:
        readtable(FILENAME, FILETYPE), and
    where readtable corresponds to the other command, FILENAME corresponds to the file name, and FILETYPE corresponds to the file type.

10. The method of claim 9, where the file type includes one of:
    a text file type,
    a spreadsheet file type, or
    an xport file type.

11. The method of claim 1, further comprising:
    receiving a file name for a file;
    receiving another command to write the heterogeneous table to the file; and
    writing, based on the other command, the heterogeneous table to the file with the file name,
        where the other command includes a syntax of:
            write(T, FILENAME), and
        where write corresponds to the other command, T corresponds to the heterogeneous table, and FILENAME corresponds to the file name.

12. The method of claim 1, further comprising:
    receiving another command to write the heterogeneous table to a file; and
    writing, based on the other command, the heterogeneous table to the file,
        where the other command includes a syntax of:
            write(T),
        where write corresponds to the other command, and
        where T corresponds to the heterogeneous table.

13. A non-transitory computer-readable medium for storing instructions, the instructions comprising:
    one or more instructions that, when executed by a processor of a device, cause the processor to:
        receive, in a technical computing environment (TCE), a first variable with a first data type and a particular number of rows,
        receive a second variable with a second data type and the particular number of rows,
            the second data type being different than the first data type,
        receive a command to create a table based on the first variable and the second variable,
            the command including a syntax of:
                table(VAR1, VAR2),
            where table corresponds to the command, VAR1 corresponds to the first variable, and VAR2 corresponds to the second variable,
        create, based on the command, a heterogeneous table that includes the first variable and the second variable, and
        store the heterogeneous table.

14. The non-transitory computer-readable medium of claim 13, where the instructions further comprise:
    one or more instructions that, when executed by the processor, cause the processor to:
        provide the heterogeneous table for display.

15. The non-transitory computer-readable medium of claim 13, where the instructions further comprise:
    one or more instructions that, when executed by the processor, cause the processor to:
        receive variable names for the first variable and the second variable,
        receive row names for rows of the first variable and rows of the second variable, and
    where the one or more instructions to create the heterogeneous table comprise:
        one or more instructions that, when executed by the processor, cause the processor to:
            create the heterogeneous table based on the command, the variable names, and the row names,
                the heterogeneous table including the variable names for columns of the heterogeneous table, and
                the heterogeneous table including the row names for rows of the heterogeneous table.

16. The non-transitory computer-readable medium of claim 13, where the instructions further comprise:
    one or more instructions that, when executed by the processor, cause the processor to:
        receive a file name for a file,
        receive a file type associated with the file,
        receive another command to write the heterogeneous table to the file,
        write, based on the other command, the heterogeneous table to the file with the file name and the file type, and
        store the file.

17. The non-transitory computer-readable medium of claim 16, where the other command includes a syntax of:
    writetable(T, FILENAME, FILETYPE), and
    where writetable corresponds to the other command, T corresponds to the heterogeneous table, FILENAME corresponds to the file name, and FILETYPE corresponds to the file type.

18. The non-transitory computer-readable medium of claim 17, where the file type indicates a default file type.

19. The non-transitory computer-readable medium of claim 16, where the file type includes one of:
    a text file type,
    a spreadsheet file type, or
    an xport file type.

20. The non-transitory computer-readable medium of claim 13, where the instructions further comprise:
    one or more instructions that, when executed by the processor, cause the processor to:
        receive a file name for a file,
        receive a file type associated with the file,
        receive another command to read the heterogeneous table from the file, and
        read, based on the other command, the heterogeneous table from the file with the file name and the file type.

21. The non-transitory computer-readable medium of claim 20, where the other command includes a syntax of:
readtable(FILENAME, FILETYPE), and
where readtable corresponds to the other command, FILENAME corresponds to the file name, and FILETYPE corresponds to the file type.

22. The non-transitory computer-readable medium of claim 21, where the file type includes one of:
a text file type,
a spreadsheet file type, or
an xport file type.

23. The non-transitory computer-readable medium of claim 13,
where the instructions further comprise:
one or more instructions that, when executed by the processor, cause the processor to:
receive a file name for a file,
receive another command to write the heterogeneous table to the file, and
write, based on the other command, the heterogeneous table to the file,
where the other command includes a syntax of:
write(T, FILENAME), and
where write corresponds to the other command, T corresponds to the heterogeneous table, and FILENAME corresponds to the file name.

24. The non-transitory computer-readable medium of claim 13,
where the instructions further comprise:
one or more instructions that, when executed by the processor, cause the processor to:
receive another command to write the heterogeneous table to a file, and
write, based on the other command, the heterogeneous table to the file,
where the other command includes a syntax of:
write(T),
where write corresponds to the other command, and
where T corresponds to the heterogeneous table.

25. A device comprising:
one or more processors to:
receive, in a technical computing environment (TCE), a first variable with a first data type and a particular number of rows,
receive a second variable with a second data type and the particular number of rows,
the second data type being different than the first data type,
receive a command to create a table based on the first variable and the second variable,
the command including a syntax of:
table(VAR1, VAR2),
where table corresponds to the command, VAR1 corresponds to the first variable, and VAR2 corresponds to the second variable,
create, based on the command, a heterogeneous table that includes the first variable and the second variable,
store the heterogeneous table, and
provide the heterogeneous table for display.

26. The device of claim 25,
where the one or more processors are further to:
receive variable names for the first variable and the second variable, and
receive row names for rows of the first variable and rows of the second variable, and
where, when creating the heterogeneous table, the one or more processors are to:
create the heterogeneous table based on the command, the variable names, and the row names,
the heterogeneous table including the variable names for columns of the heterogeneous table, and
the heterogeneous table including the row names for rows of the heterogeneous table.

27. The device of claim 25, where the one or more processors are further to:
receive a file name for a file,
receive a file type associated with the file,
receive another command to write the heterogeneous table to the file,
write, based on the other command, the heterogeneous table to the file with the file name and the file type, and
store the file.

28. The device of claim 15, where the other command includes a syntax of:
writetable(T, FILENAME, FILETYPE), and
where writetable corresponds to the other command, T corresponds to the heterogeneous table, FILENAME corresponds to the file name, and FILETYPE corresponds to the file type.

29. The device of claim 28, where the file type indicates a default file type.

30. The device of claim 27, where the file type includes one of:
a text file type,
a spreadsheet file type, or
an xport file type.

31. The device of claim 27, where the one or more processors are further to:
receive a file name for a file,
receive a file type associated with the file,
receive another command to read the heterogeneous table from the file, and
read, based on the other command, the heterogeneous table from the file with the file name and the file type.

32. The device of claim 31,
where the other command includes a syntax of:
T=readtable(FILENAME, FILETYPE), and
where T corresponds to the heterogeneous table, readtable corresponds to the other command, FILENAME corresponds to the file name, and FILETYPE corresponds to the file type.

33. The device of claim 32, where the file type includes one of:
a text file type,
a spreadsheet file type, or
an xport file type.

34. The device of claim 25,
where the one or more processors are further to:
receive a file name for a file,
receive another command to write the heterogeneous table to the file, and
write, based on the other command, the heterogeneous table to the file,
where the other command includes a syntax of:
write(T, FILENAME), and
where write corresponds to the other command, T corresponds to the heterogeneous table, and FILENAME corresponds to the file name.

35. The device of claim 25,
where the one or more processors are further to:
receive another command to write the heterogeneous table to a file, and
write, based on the other command, the heterogeneous table to the file, where the other command includes a syntax of:
write(T),
where write corresponds to the other command, and
where T corresponds to the heterogeneous table.

* * * * *